United States Patent [19]

Santoh et al.

[11] Patent Number: 5,187,043
[45] Date of Patent: Feb. 16, 1993

[54] OPTICAL RECORDING MEDIUM

[75] Inventors: Tsuyoshi Santoh, Yokohama; Chieko Mihara, Kawasaki, both of Japan

[73] Assignee: Canon Kabushiki Kaisha, Tokyo, Japan

[21] Appl. No.: 794,835

[22] Filed: Nov. 12, 1991

Related U.S. Application Data

[63] Continuation of Ser. No. 707,980, May 23, 1991, abandoned, which is a continuation of Ser. No. 598,780, Oct. 18, 1990, abandoned, which is a continuation of Ser. No. 467,524, Jan. 19, 1990, abandoned.

[30] Foreign Application Priority Data

Jan. 20, 1989 [JP] Japan .................................. 1-9887
Jan. 20, 1989 [JP] Japan .................................. 1-9889
Mar. 22, 1989 [JP] Japan .................................. 1-67465

[51] Int. Cl.$^5$ .............................................. G03C 1/72
[52] U.S. Cl. ................................... 430/270; 430/495; 430/945
[58] Field of Search ................. 430/270, 495, 945; 346/135.1

[56] References Cited

U.S. PATENT DOCUMENTS

| | | | |
|---|---|---|---|
| 4,756,987 | 7/1988 | Maeda et al. | 430/495 |
| 4,876,356 | 10/1989 | Dust et al. | 430/270 |
| 4,906,541 | 3/1990 | Dust et al. | 430/945 |
| 4,939,012 | 7/1990 | Dust et al. | 430/945 |

*Primary Examiner*—Lee C. Wright
*Attorney, Agent, or Firm*—Fitzpatrick, Cella, Harper & Scinto

[57] ABSTRACT

Described is an optical recording medium comprising at least one of naphtholactam compounds represented by the specific formulas. The optical recording medium has absorption at the long wavelength side, can make a record with high sensitivity even when a long wavelength oscillation laser such as a semiconductor layer is used, and can obtain a high C/N ratio because of the capability of forming pits with good shapes. It is also possible to provide an optical recording medium which can be readily prepared by coating, has good stability to heat, and has superior storage stability with less reproduction deterioration.

8 Claims, 1 Drawing Sheet

OPTICAL RECORDING MEDIUM

This application is a continuation of application Ser. No. 707,980 filed May 23, 1991, now abandoned, which is a continuation of application Ser. No. 598,780, filed Oct. 18, 1990, now abandoned, which is a continuation of application Ser. No. 467,524, filed Jan. 19, 1990, now abandoned.

BACKGROUND OF THE INVENTION

1. Field of the Invention

The present invention relates to an optical recording medium that is suitable for making a record with laser beams, particularly semiconductor laser beams. More particularly, it relates to an optical recording medium that can be used for optical disc or optical card techniques.

2. Related Background Art

Generally speaking, optical recording mediums such as optical discs or optical cards can record information at a high density by forming small pits of, for example, about 1 μm which can be optically detected on a thin recording layer provided on a substrate, having spiral, circular or linear grooves.

When a laser beam converged on the surface of a recording layer is scanned, the recording layer absorbs laser energy to form optically detectable pits, whereby the information is written.

For example, according to a heat mode recording system, the recording layer absorbs heat energy and small concave pits can be thereby formed by evaporation or melting at that site. According to another heat mode recording system, as a result of the absorption of the laser energy applied, pits having optically detectable density difference can be formed at that site.

Recording mediums having been proposed as the optical recording mediums used in such optical discs and optical cards include those mainly using metallic thin films such as an aluminum-deposited film, and inorganic materials such as a bismuth thin film, a tellurium oxide film and a chalcogenide amorphous glass film. These thin films commonly show a sensitivity to the light with wavelengths of about 350 to 800 nm and also have a high reflectance to laser beams. Thus they have the disadvantages such that the laser beams are utilized at a low rate.

Under such circumstances, researches have been made on an optical recording medium comprising a thin film of an organic compound that can cause optical changes of physical properties, using light energy of relatively long wavelengths (for example, 780 nm or more). Such an optical recording medium can form the pits, i.e., holes, concaves, and/or optical changes, using a semiconductor laser having an oscillation wavelength of about 780 nm or about 830 nm and also the thin film of an organic compound can be formed by coating, so that optical recording mediums can be obtained at a low cost.

In general, however, the organic compound having absorption characteristics at the long wavelength side has the problem that it is unstable to heat.

For example, optical recording mediums are not always handled only in offices provided with satisfactory air-conditioning equipment, and it must be taken into account that they are stored in warehouses for transportation or suffer rise of internal temperature in recording-reproducing units. Thus, it has been sought to provide a medium having better stability in high-temperature atmospheres. In particular, when the optical recording medium is an optical card, it is difficult for the medium to take hollow structure (or air-sandwich structure) from the viewpoint of the thickness and strength required for the card. Hence, it necessarily takes laminated structure in which an opposed substrate is directly laminated on a recording layer with an adhesive. The adhesive effectively usable for such purpose includes hot-melt adhesives, which may not lower the sensitivity for the writing in the recording layer and have excellent workability. When, however, the hot-melt adhesives are used, the temperature reaches about 100° C. at the time of lamination though for a short period of time. Thus, it has been sought to provide a medium comprising a recording layer having better high-temperature resistance.

Moreover, in many instances, optical cards are handled while they are personally carried and there is a high possibility that they are handled carelessly. Thus, it has been sought to provide a medium having excellent environmental stability including the high-temperature resistance.

As the optical recording medium of this type, mediums with a variety of constitution have been proposed. For example, Japanese Laid-Open Patent Application No. 62-132681 discloses an optical recording medium having good light-resistance and resistance to reproducing light, which comprises a recording layer containing a naphtholactam compound as represented by the following formula:

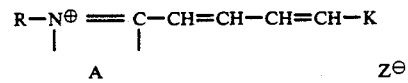

wherein K represents a substituted or unsubstituted aromatic amine residual group, R represents a substituted or unsubstituted alkyl group, cycloalkyl group, aryl group or ally group, and the ring A represents a substituted or unsubstituted naphthalene ring. Japanese Laid-Open Patent Application No. 62-230857 also discloses an optical recording medium containing a naphtholactam coloring matter as represented by the following formula, that can be stable and free from corrosion for a long period of time.

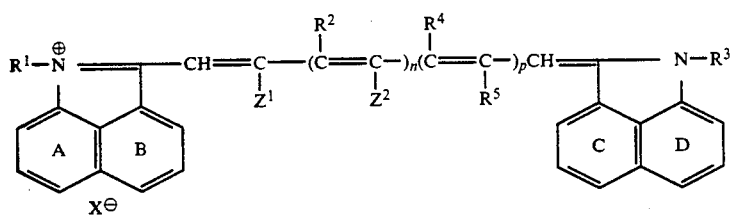

SUMMARY OF THE INVENTION

An object of the present invention is to provide an optical recording medium that has high sensitivity and is also stable to heat and light, having great absorption and high reflection characteristics in the wavelengths of visible and near infrared regions.

Another object of the present invention is to provide an optical recording medium that can be prepared by coating.

The optical recording medium of the present invention is characterized by containing a naphtholactam compound represented by the following Formula (I), (II), (III), (IV) or (V):

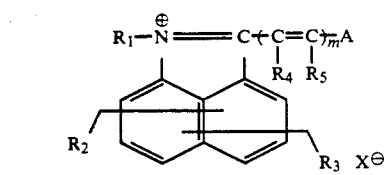

Formula (I)

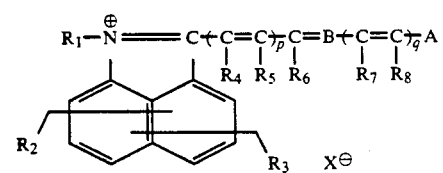

Formula (II)

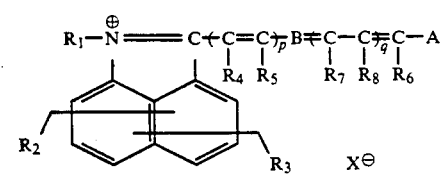

Formula (III)

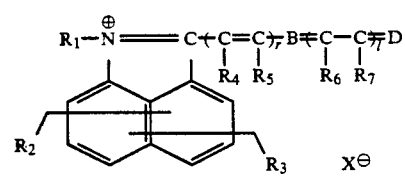

(Formula (IV))

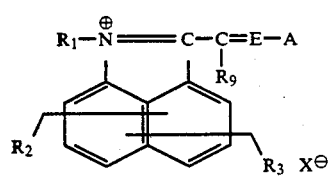

Formula (V)

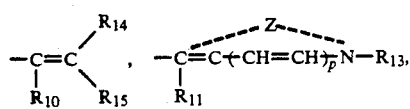

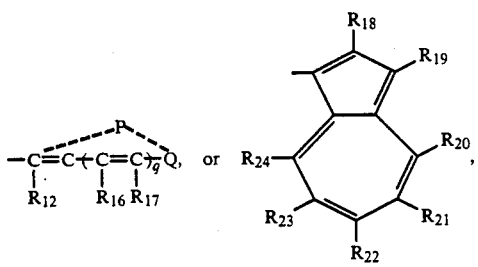

B represents

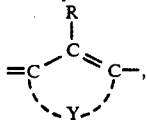

D represents

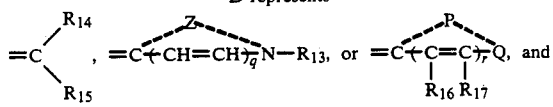

E represents

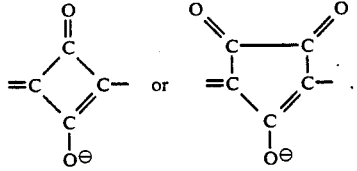

Z represents a group of atoms necessary to complete a substituted or unsubstituted heterocyclic ring.

Q represents a sulfur atom, an oxygen atom, or a selenium atom. P represents a hydrocarbon group comprising a group of atoms necessary to complete a substituted or unsubstituted pyran, thiopyran, selenapyran, benzopyran, benzothiopyran, benzoselenapyran, naphthopyran, naphthothiopyran or naphthoselenapyran.

Y represents a divalent hydrocarbon group that forms a substituted or unsubstituted ring of 5 or 6 members.

In Formulas (I) to (V), $R_1$ represents a substituted or unsubstituted alkyl group, cycloalkyl group, alkoxy group, allyl group, aryl group or aralkyl group, and $R_2$ to $R_{12}$ and $R_{18}$ to $R_{24}$ each represent a hydrogen atom, a halogen atom or a monovalent organic residual group. At least one combination of the combinations of $R_{18}$ and $R_{19}$, $R_{19}$ and $R_{20}$, $R_{20}$ and $R_{21}$, $R_{21}$ and $R_{22}$, $R_{22}$ and $R_{23}$, and $R_{23}$ and $R_{24}$ may form a substituted or unsubstituted condensed ring.

$R_{13}$ represents a hydrogen atom, a substituted or unsubstituted alkyl group, a cyclic alkyl group, an allyl group, a substituted or unsubstituted aralkyl group or a substituted or unsubstituted aryl group.

$R_{14}$, $R_{15}$, $R_{16}$ and $R_{17}$ each represent a substituted or unsubstituted alkyl group, a substituted or unsubstituted aryl group, a substituted or unsubstituted styryl group, or a substituted or unsubstituted heterocyclic group.

The letter symbol m represents an integer of 1, 2 or 3; p, an integer of 0, 1 or 2; q, an integer of 0, 1 or 2; r, an integer of 1 or 2; and l, an integer of 1 or 2.

In the naphtholactam compound of the present invention, it is presumed that its conjugated system is stabilized by the organic residual groups represented by A, B, D and E and hence the stability to heat and light can be more improved.

DETAILED DESCRIPTION OF THE PREFERRED EMBODIMENTS

Figure 1:
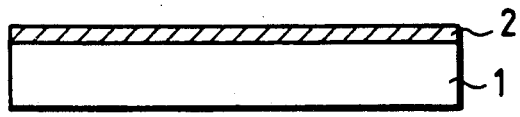
FIGS. 1-4 are cross-sectional view of the optical recording mediums according to the present invention.

The present invention will be described below in detail.

The optical recording medium of the present invention is characterized by having a recording layer containing at least one of the naphtholactam compound represented by the above Formula (I), (II), (III), (IV) or (V), which absorbs electromagnetic radiations to undergo thermal action, and causes optical changes as a result of such thermal action.

In the above Formula (I), (II), (III), (IV) or (V), $R_1$ in the formula represents a $C_1$ to $C_{20}$ alkyl group, which may be substituted with a phenyl group, a halogen atom, a $C_1$ to $C_4$ alkanoyl group, a carboxyl group, a $C_1$ to $C_4$ alkalnoylamino group, a $C_1$ to $C_4$ alkoxycarbonyl group, a $C_1$ to $C_4$ alkoxycarbonylamino group or a $C_1$ to $C_4$ alkylanilino group, and/or interrupted with an oxygen atom, and includes, for example, a methyl group, an ethyl group, a propyl group, an isopropyl group, a butyl group, an isobutyl group, a tertiary butyl group, a pentyl group, a 2-methylbutyl group, a hexyl group, a 2-methylpentyl group, a heptyl group, an octyl group, a 2-ethylhexyl group, an isooctyl group, a nonyl group, an isononyl group, a decyl group, an isodecyl group, a dodecyl group, a 3,5,5,7-tetramethylnonyl group, an isotridecyl group, a pentadecyl group, a hexadecyl group, a heptadecyl group, an octadecyl group, a nonadecyl group, an eicocyl group (the names for isooctyl, isononyl, isodecyl and isotridecy are common names, which originate from alcohols obtained by oxo synthesis; regarding this, see Ullmann's Entikropedie der Technischen Chemie, Fourth Edition, Vol. 7, pp. 216-217, and Vol. 11, pp. 435-436), a benzyl group, a 2-phenylethyl group, a trifluoromethyl group, a trichloromethyl group, a 1,1,1-trifluoroethyl group, a heptafluoropropyl group, a 2-methoxyethyl group, a 2-ethoxypropyl group, a 3-ethoxypropyl group, a 3,6-dioxaheptyl group, a 3,6-dioxaoctyl group, a 3,6,9-trioxadecyl group, a propan-2-one-1-yl group, a butan-3-one-1-yl group, a 2-ethylpentan-3-one-1-yl group, a carboxymethyl group, a 2-carboxyethyl group, a 3-carboxypropyl group, a 4-carboxybutyl group, a 5-carboxypentyl group, a 4-carboxy-3-oxabutyl group, an acetylaminomethyl group, a 2-(acetylamino)-ethyl group, a 2-(butylamino)-ethyl group, an ethoxycarbonylmethyl group, a 2-(ethoxycarbonyl)-ethyl group, a 3-(methoxycarbonyl)-propyl group, an ethoxycarbonylaminomethyl group, a 2-(ethoxycarbonylamino)-ethyl group, a 4-methylanilinomethyl group, and a 2-(4-isopropylanilino)-ethyl group; a $C_5$ to $C_7$ cycloalkyl group, which may be substituted with a $C_1$ to $C_4$ alkyl group or a halogen atom, and includes, for example, a cyclopentyl group, a cyclohexyl group, a cycloheptyl group, a 3-methylcyclopentyl group, a 4-ethylcyclohexyl group, and a 2,3-dichlorocyclohexyl group; an aryl group, which may be substituted with a $C_1$ to $C_4$ alkyl group, a $C_1$ to $C_4$ alkoxy group, a halogen atom or a $C_1$ to $C_4$ dialkylamino group, and includes, for example, a phenyl group, a naphthyl group, a tolyl group, a 4-methylphenyl group, a 4-isopropylphenyl group, a 4-methoxyphenyl group, a 2,4-dimethoxyphenyl group, a 2-chlorophenyl group, a 4-bromophenyl group, and a 4-dimethylaminophenyl group; an alkoxy group, which includes, for example, a methoxy group, an ethoxy group, a propoxy group, and a butoxy group; an allyl group ($CH_2=CH-CH_2-$); or an aralkyl group, which includes, for example, a benzyl group, a phenethyl group, an α-naphthylmethyl group, a β-naphthylmethyl group, a carboxybenzyl group, a sulfobenzyl group, and a hydroxybenzyl group.

The naphthalene ring, to which $R_2$ and $R_3$ are bonded, may be unsubstituted (i.e., hydrogen atoms) or may be substituted with $R_2$ and $R_3$. Alternatively, it may be subjected to benzoin condensation.

$R_2$ to $R_{12}$ and $R_{18}$ to $R_{24}$ each represent a hydrogen atom, a halogen atom such as a chlorine atom, a fluorine atom, a bromine atom or an iodine atom, or a monovalent organic residual group.

The monovalent organic residual group can be selected from groups covering a wide range, including an alkyl group as exemplified by methyl, ethyl, n-propyl, isopropyl, n-butyl, t-butyl, n-amyl, n-hexyl, n-octyl, 2-ethylhexyl, or t-octyl; an alkoxy group as exemplified by methoxy, ethoxy, propoxy, or butoxy; a substituted or unsubstituted aryl group as exemplified by phenyl, tolyl, xylyl, ethylphenyl, methoxyphenyl, ethoxyphenyl, chlorophenyl, nitrophenyl, aminophenyl, dimethylaminophenyl, α-naphthyl, or β-naphthyl; a substituted or unsubstituted heterocyclic group as exemplified by pyridyl, quinolyl, carbzolyl, furyl, thienyl, or pyrazolyl; a substituted or unsubstituted aralkyl group as exemplified by benzyl, 2-phenylethyl, 2-phenyl-1-methylethyl, bromobenzyl, 2-bromophenylethyl, methylbenzyl, methoxybenzyl, or nitrobenzyl; an acyl group as exemplified by acetyl, propionyl, butylyl, valelyl, benzoyl, tolyoyl, naphthoyl, or phthaloyl; a substituted or unsubstituted amino group as exemplified by amino, dimethylamino, diethylamino, dipropylamino, acetylamino, or benzoylamino; a substituted or unsubstituted styryl group as exemplified by styryl, dimethylaminostyryl, diethylaminostyryl, dipropylaminostyryl, methoxystyryl, ethoxystyryl, or methylstyryl; a sulfonyl group as exemplified by methylsulfonyl, methoxysulfonyl, phenylsulfonyl, methylsulfonyl, or hydroxysulfonyl; an alkylthio group as exemplified by methylthio, or ethylthio; a substituted or unsubstituted arylazo group as exemplified by phenylazo, α-naphthylazo, β-naphthylazo, dimethylaminophenylazo, chlorophenylazo, nitrophenylazo, methoxyphenlazo, or tolylazo; as well as a nitro group, a hydroxyl group, a mercapto group, a thioether group, a carboxyl group, a carboxylic acid ester, a carboxylic acid amide, and a cyano group. There may further be included an alkanoyl group, an alkanoylamino group, an alkoxycarbonyl group, an alkoxycarbonylamino group, a carbamoyl group, a N-monoalkylcarbamoyl group, a N,N-dialkylcarbamoyl group, a sulfamoyl group, a N-monoalkylsulfamoyl group, a N,N-dialkylsulfamoyl group, a ureido group, a phenoxy group, and a phenylthio group.

R₂ and R₃ may also combine to form a substituted or unsubstituted condensed ring.

Of the combinations of $R_{18}$ and $R_{19}$, $R_{19}$ and $R_{20}$, $R_{20}$ and $R_{21}$, $R_{21}$ and $R_{22}$, $R_{22}$ and $R_{23}$, and $R_{23}$ and $R_{24}$, at least one combination may form a substituted or unsubstituted condensed ring. The condensed ring includes a substituted or unsubstituted aromatic ring as exemplified by benzene, naphthalene, chlorobenzene, bromobenzene, methylbenzene, ethylbenzene, methoxybenzene, and ethoxybenzene; a heterocyclic ring as exemplified by a furan ring, a benzofuran ring, a pyrol ring, a thiophene ring, a pyridine ring, a quinoline ring, and a thiazole ring; an aliphatic ring as exemplified by dimethylene, trimethylene, and tetramethylene.

In the group

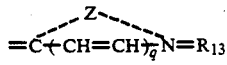

represented by A and D, $R_{13}$ represents a hydrogen atom; an alkyl group as exemplified by a methyl group, an ethyl group, a n-propyl group, an iso-propyl group, a n-butyl group, a sec-butyl group, an iso-butyl group, a t-butyl group, a n-amyl group, a t-amyl group, an n-hexyl group, or a n-octyl group, a t-octyl group; a substituted alkyl group as exemplified by a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(methylsulfonyl)-carbamylmethyl group, a 3-(acetylsulfamyl)propyl group, or a 4-(acetylsulfamyl)-butyl group; a cyclic alkyl group as exemplified by a cyclohexyl group; an alkenyl group as exemplified by an allyl group ($CH_2=CH-CH_2-$); an aralkyl group as exemplified by a benzyl group, a phenethyl group, an α-naphthylmethyl group, or a β-naphthylmethyl group; a substituted aralkyl group as exemplified by a carboxybenzyl group, a sulfobenzyl group, or a hydroxybenzyl group; an aryl group as exemplified by a phenyl group, or a substituted aryl group as exemplified by a carboxyphenyl group, a sulfophenyl group, or a hydroxyphenyl group.

Z represents a group of atoms necessary to complete a substituted or unsubstituted heterocyclic ring, including nuclei of thiazole series as exemplified by thiazole, 4-methylthiazole, 4-phnenylthiazole, 5-methylthiazole, 5-phenylthiazole, 4,5-dimethylthiazole, 4,5-diphenyl-thiazole, and 4-(2-thienyl)-thiazole; nuclei of benzothiazole series as exemplified by benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6-methoxybenzothiazole, 5,6-dimethoxybenzothiazole, 5,6-dioxymethylenebenzothiazole, 5-hydroxybenzothiazole, 6-hydroxybenzothiazole, and 4,5,6,7-tetrahydrobenzothiazole; nuclei of naphthothiazole series as exemplified by naphtho[2,1-d]thiazole, naphtho[1,2-d]thiazole, 5-methoxynaphtho[1,2-d]thiazole, 5-ethoxynaphtho[1,2-d]thiazole, 8-methoxynaphtho[2,1-d]thiazole, and 7-methoxynaphtho[2,1-d]thiazole; nuclei of thionaphthene[7,6-d]thiazole series as exemplified by 7-methoxythionaphthene[7,6-d]thiazole; nuclei of oxazole series as exemplified by 4-methyloxazole, 5-methyloxazole, 4-phenyloxazole, 4,5-diphenyloxazole, 4-ethyloxazole, 4,5-dimethyloxazole, and 5-phenyloxazole; nuclei of benzoxazole series as exemplified by benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxybenzoxazole, and 6-hydroxybenzoxazole; nuclei of naphthoxazole series as exemplified by naphtho[2,1-d]oxazole, and naphtho[1,2-d]oxazole; nuclei of selenazole series as exemplified by 4-methylselenazole, and 4-phenylselenazole; nuclei of benzoselenazole series as exemplified by benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-dioxymethylenebenzoselenazole, 5-hydroxybenzoselenazole, and 4,5,6,7-tetrahydrobenzoselenazole; nuclei of naphthoselenazole series as exemplified by naphto[2,1-d]selenazole, and naphto[1,2-d]selenazole; nuclei of thiazoline series as exemplified by thiazoline, 4-methylthiazoline, 4-hydroxymethyl-4-methylthiazoline, and 4,4-bishydroxymethylthiazoline; nuclei of oxazoline series as exemplified by oxazoline; nuclei of selenazoline series as exemplified by selenazoline; nuclei of 2-quinoline series as exemplified by quinoline, 6-methylquinoline, 6-chloroquinoline, 6-methoxyquinoline, 6-ethoxyquinoline, and 6-hydroxyquinoline; nuclei of 4-quinoline series as exemplified by quinoline, 6-mthoxyquinoline, 7-methylquinoline, and 8-methylquinoline; nuclei of 1-isoquinoline series as exemplified by isoquinoline, and 3,4-dihydroisoquinoline; nuclei of 3-isoquinoline as exemplified by isoquinoline; nuclei of 3,3-dialkylindolenine series as exemplified by 3,3-dimethylindolenine, 3,3-dimethyl-5-chloroindolenine, 3,3,5-trimethylindolenine, and 3,3,7-trimethylindolenine; nuclei of pyridine series as exemplified by pyridine, and 5-methylpyridine; and nuclei of benzimidazole series as exemplified by 1-ethyl-5,6-dichlorobenzoimidazole, 1-hydroxyethyl-5,6-dichlorobenzoimidazole, 1-ethyl-5,6-dichlorobenzoimidazole, 1-ethyl-5,6-dibromobenzoimidazole, 1-ethyl-5-phenylbenzoimidazole, 1-ethyl-5-fluorobenzimidazole, 1-ethyl-5-cyanobenzoimidazole, 1-(β-acetoxyethyl)-5-cyanobenzoimidazole, 1-ethyl-5-chloro-6-cyanobenzoimidazole, 1-ethyl-5-fluoro-6-cyanobenzoimidazole, 1-ethyl-5-acetylbenzoimidazole, 1-ethyl-5-carboxybenzoimidazole, 1-ethyl-5-ethoxycarbonylbenzoimidazole, 1-ethyl-5-sulfamylbenzoimidazole, 1-ethyl-5-N-ethylsulfamylbenzoimidazole, 1-ethyl-5,6-difluorobenzoimidazole, 1-ethyl-5,6-dicyanobenzoimidazole, 1-ethyl-5-ethylsulfonylbenzoimidazole, 1-ethyl-5-methylsulfonylbenzoimidazole, 1-ethyl-5-trifluoromethylbenzoimidazole, 1-ethyl-5-trifluoromethylsulfonylbenzoimidazole, and 1-ethyl-5-trifluoromethylsulfinylbenzoimidazole.

In the group

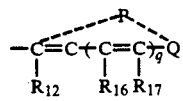

represented by A and the group

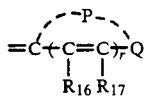

represented by B, Q represents a sulfur atom, an oxygen atom or a selenium atom. P represents a hydrocarbon group comprising a group of atoms necessary to complete pyran, thiopyran, selenapyran, benzopyran, benzothiopyran, benzoselenapyran, naphthopyran, naphthothiopyran or naphthoselenapyran, which may be substituted.

These rings may be substituted with an alkyl group such as methyl, ethyl, n-propyl, isopropyl, n-butyl, t-butyl, n-acyl, t-acyl, n-hexyl, n-octyl, t-octyl, or 2-ethylhexyl; an alkoxy group such as methoxy, ethoxy, propoxy, or butoxy; a substituted or unsubstituted aryl group such as phenyl, tolyl, xylyl, biphenyl, ethylphenyl, methoxyphenyl, ethoxyphenyl, diethoxyphenyl, hydroxyphenyl, chlorophenyl, dichlorophenyl, bromophenyl, dibromophenyl, nitrophenyl, diethylaminophenyl, dimethylaminophenyl, or dibenzylaminophenyl; a styryl group or a 4-phenyl-1,3-butadienyl or its derivative, such as styryl, 4-phenyl-1,3-butadienyl, methoxystyryl, dimethoxystyryl, ethoxystyryl, diethoxystyryl, dimethylaminostyryl, 4-(p-dimethylaminophenyl)-1,3-butadienyl, 4-(p-diethylaminophenyl)-1,3-butadienyl; or a heterocyclic group such as 3-carbazolyl, 9-methyl-3-carbazolyl, 9-ethyl-3-carbazolyl, or 9-carbazolyl.

$R_{14}$, $R_{15}$, $R_{16}$ and $R_{17}$ each represent an alkyl group as exemplified by a methyl group, an ethyl group, a n-propyl group, an iso-propyl group, a n-butyl group, a sec-butyl group, an iso-butyl group, a t-butyl group, a n-amyl group, a t-amyl group, a n-hexyl group, a n-octyl group, or a t-octyl group, which also includes other alkyl groups, for example, a substituted alkyl group as exemplified by a 2-hydroxyethyl group, a 3-hydroxypropyl group, 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(mehtylsulfonyl)carbamylmethyl group, a 3-(acetylsulfamyl)propyl group, or a 4-(acetylsulfamyl)butyl group; a cyclic alkyl group as exemplified by a cyclohexyl group; an allyl group ($CH_2=CH-CH_2-$); an aralkyl group as exemplified by a benzyl group, a phenethyl group, an $\alpha$-naphthylmethyl group, or a $\beta$-naphthylmethyl group; and a substituted aralkyl group as exemplified by a carboxybenzyl group, a sulfobenzyl group, or a hydroxybenzyl group. They also each represent a substituted or unsubstituted aryl group as exemplified by a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, or a diphenylaminophenyl group; a substituted or unsubstituted heterocyclic group as exemplified by a pyridyl group, a quinolyl group, a lepidyl group, a methylpyridyl group, a furyl group, a thienyl group, an indolyl group, a pyrol group, a carbazolyl group, or a N-ethylcarbazolyl group; or a substituted or unsubstituted styryl group as exemplified by a styryl group, a methoxystyryl group, a dimethoxystyryl group, a trimethoxystyryl group, an ethoxystyryl group, a dimethylaminostyryl group, a diethylaminostyryl group, a dipropylaminostyryl group, a dibenzylaminostyryl group, a diphenylaminostyryl group, a 2,2-diphenylvinyl group, a 2-phenyl-2-methylvinyl group, a 2-(dimethylaminophenyl)-2-phenylvinyl group, a 2-(diethylaminophenyl)-2-phenylvinyl group, a 2-(dibenzylaminophenyl)-2-phenylvinyl group, a 2,2-di(diethylaminophenyl)vinyl group, a 2,2-di(methoxyphenyl)vinyl group, a 2,2-di(ethoxyphenyl)vinyl group, a 2-(dimethylaminophenyl)-2-methylvinyl group, or a 2-(diethylaminophenyl)-2-ethylvinyl group; or a 4-phenyl-1,3-butadienyl group as exemplified by 4-(p-dimethylaminophenyl)-1,3-butadienyl, or 4-(p-diethylaminophenyl)-1,3-butadienyl.

Both $R_{14}$ and $R_{15}$ may preferably be each a substituted or unsubstituted aryl group, in particular, an alkyl-substituted aminophenyl group, for example, a dimethylaminophenyl group or a diethylaminophenyl group, or an alkenyl-substituted aminophenyl group, for example, a diallyaminophenyl group or a dipropenylaminophenyl group, because in such an instance the stability of the compound can be more improved than that of conventional naphtholactam compounds. This is presumably because the basicity of the naphtholactam compound is increased when $R_{14}$ and $R_{15}$ are made to be as defined above.

$R_{16}$ and $R_{17}$ may also be each a hydrogen atom, or may combine with each other to form a ring, for example, a benzene ring.

Y represents a divalent hydrocarbon group that forms a substituted or unsubstituted ring of 5 or 6 members, as exemplified by $-CH_2-CH_2-$, $-CH_2-CH_2-CH_2-$,

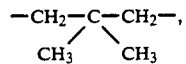

or $-CH=CH-$. These rings of 5 or 6 members may be condensed with a benzene ring or a naphthalene ring.

$X^\ominus$ represents an anion such as a chloride ion, a bromide ion, an iodide ion, a perchlorate ion, a nitrate ion, a benzene sulfonate ion, a p-toluene sulfonate ion, a methyl sulfate ion, an ethyl sulfate, a propyl sulfate ion, a tetrafluoroborate ion, a tetraphenylborate ion, a hexafluorophosphate ion, a benzenesulfonate ion, an acetate ion, a trifluoroacetate ion, a propionacetate ion, a benzoate ion, an oxalate ion, a succinate ion, a malonate ion, an oleate ion, a stearate ion, a citrate ion, a hydrogendiphosphate ion, a dihydrogenphosphate ion, a pentachlorostannate ion, a chlorosulfonate ion, a fluorosulfonate ion, a trifluoromethane sulfonate ion, a hexafluoroarsenate ion, a hexafluoroantimonate ion, a molybdate ion, a tungstate, a titanate ion, or a zirconate ion.

Examples of the naphtholactam compound used in the present invention are listed below, which, however, are by no means limited to these.

Examples of the compound represented by Formula (I):

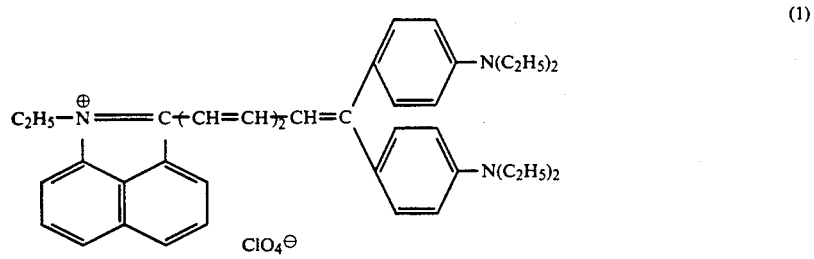
(1)
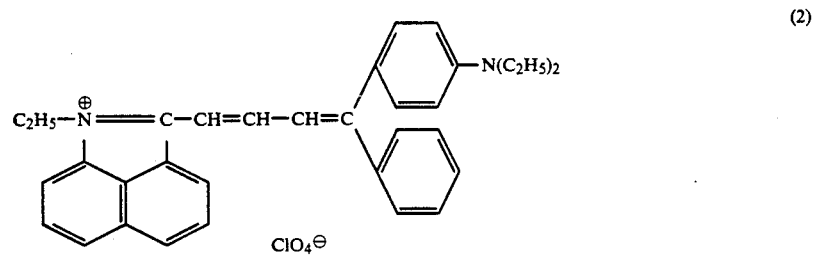
(2)
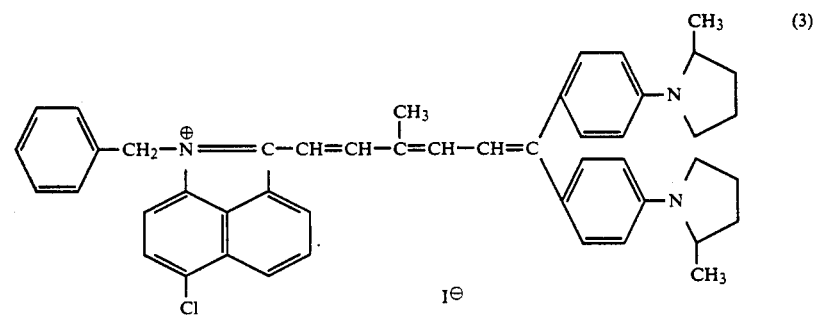
(3)
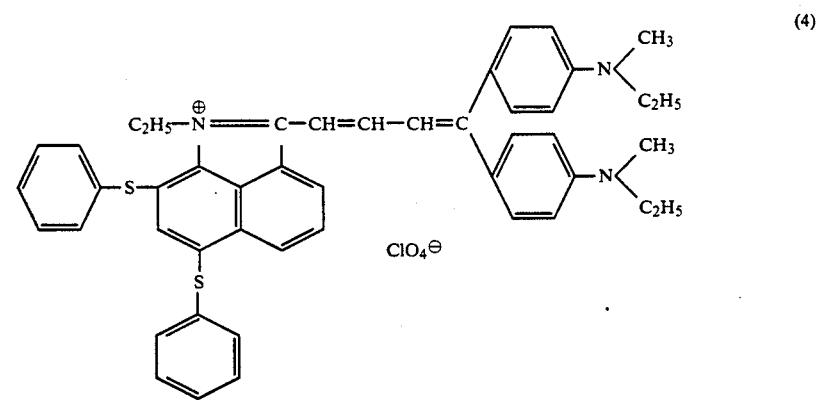
(4)
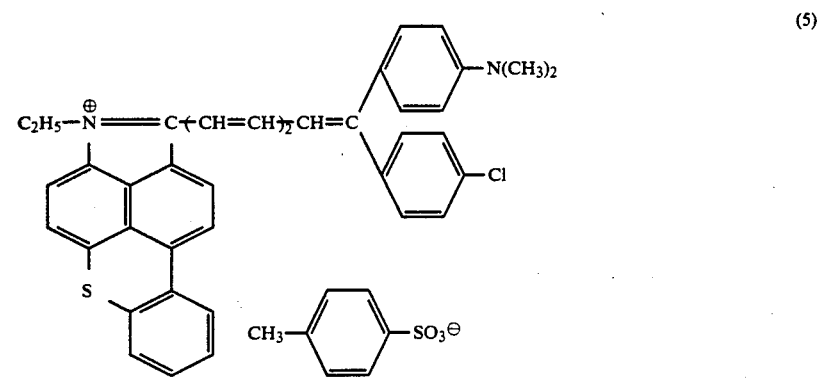
(5)

-continued
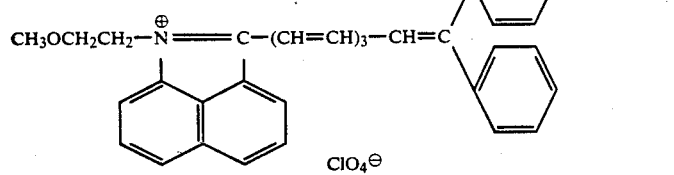
(6)
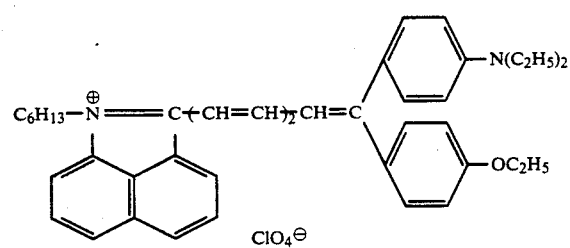
(7)
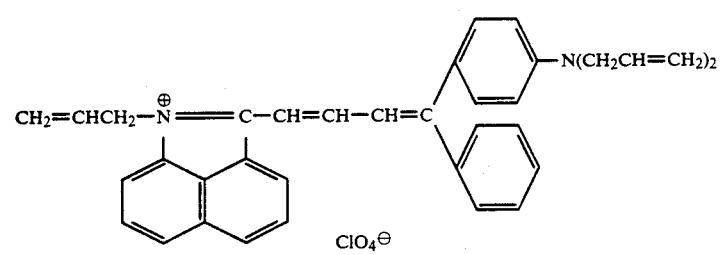
(8)
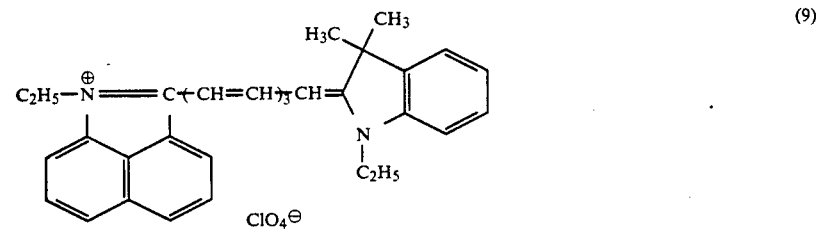
(9)
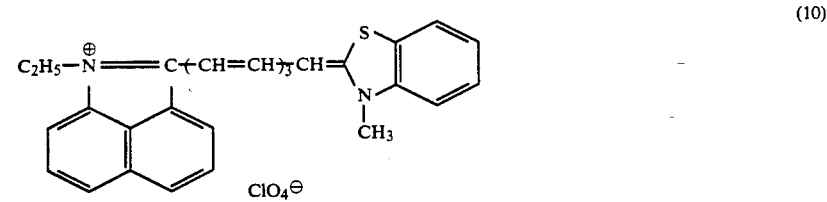
(10)
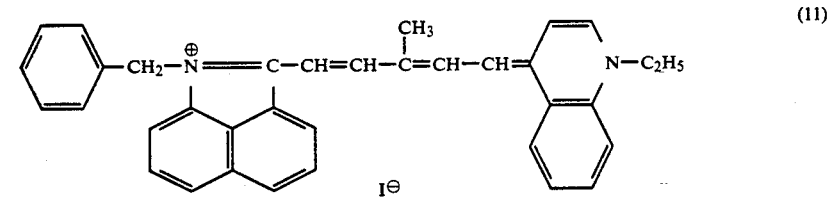
(11)
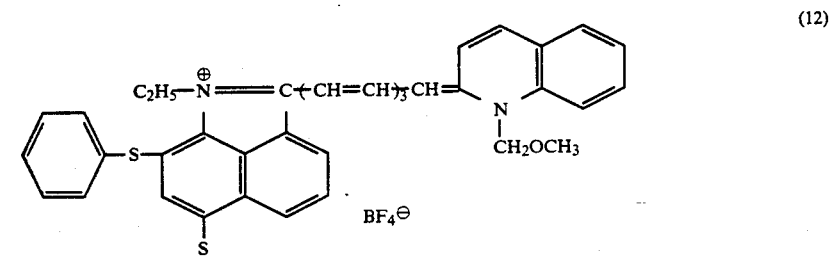
(12)

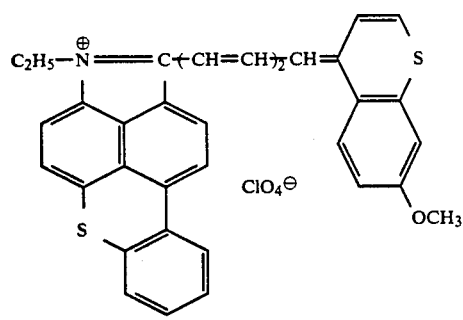
(13)
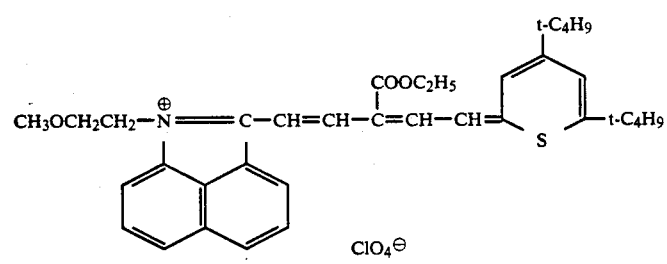
(14)
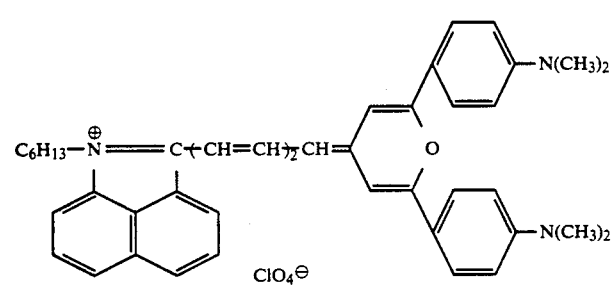
(15)
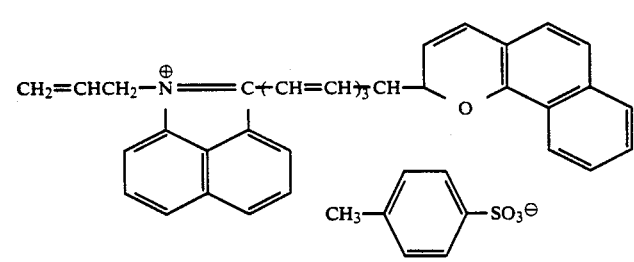
(16)
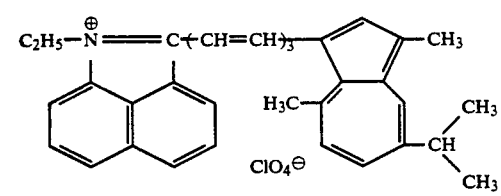
(17)
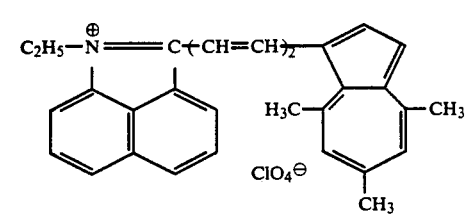
(18)

-continued
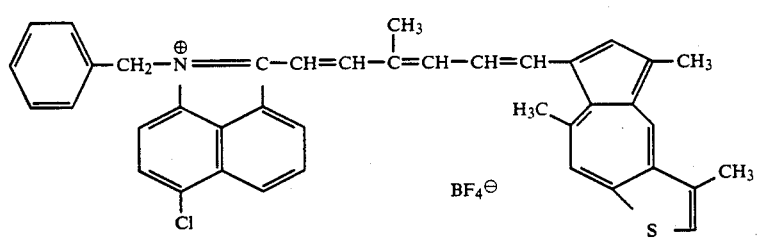 (19)
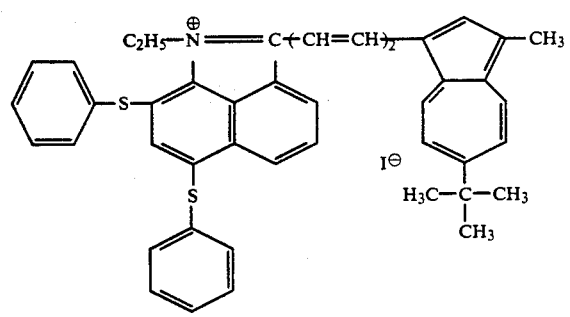 (20)
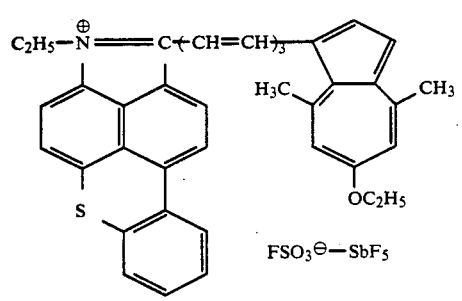 (21)
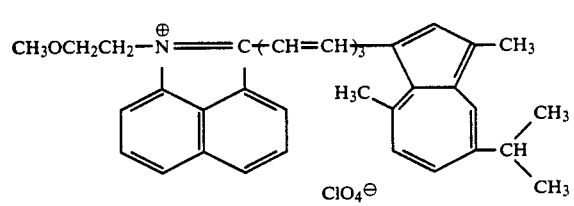 (22)
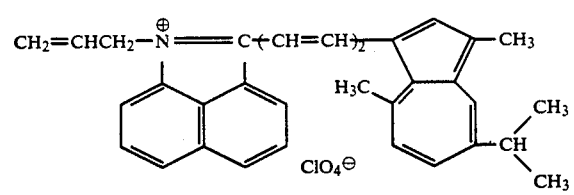 (23)
Examples of the compound represented by Formula (II):
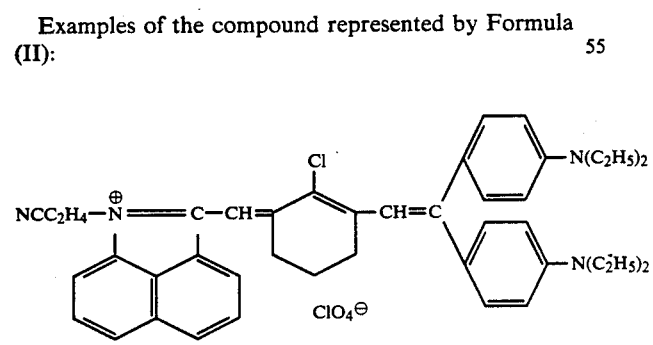 (24)

-continued
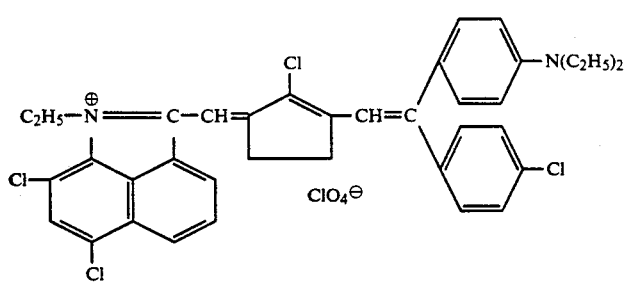
(25)
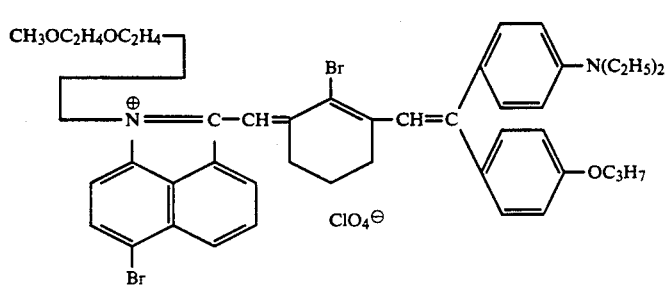
(26)
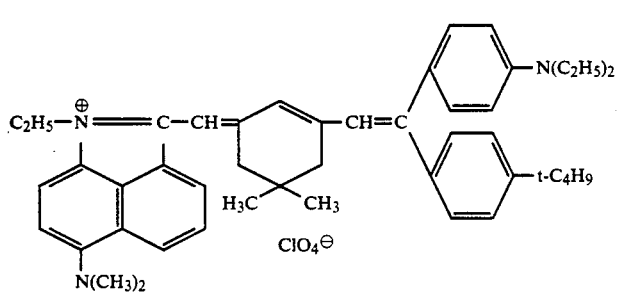
(27)
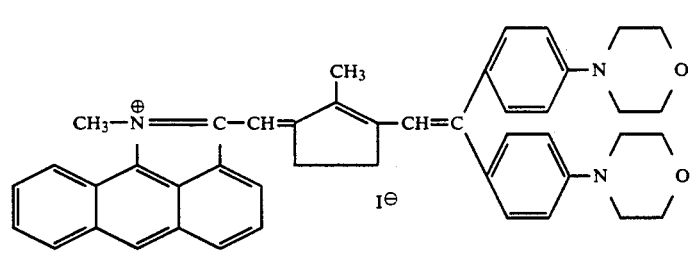
(28)
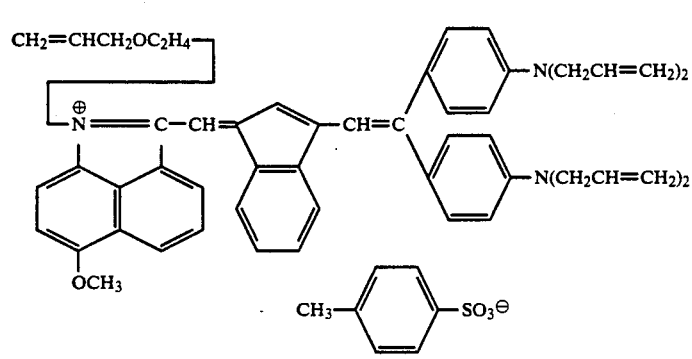
(29)

-continued
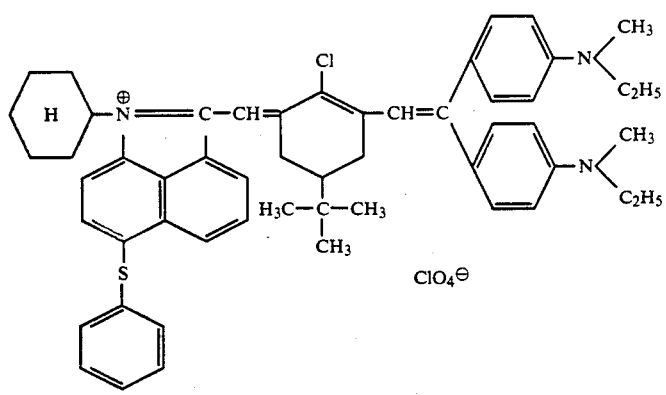 (30)
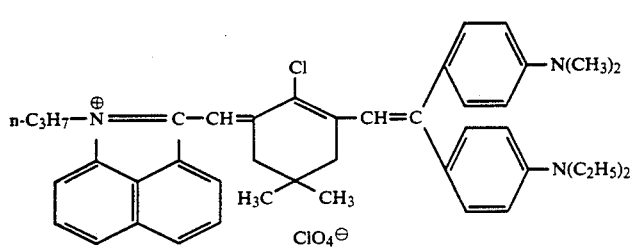 (31)
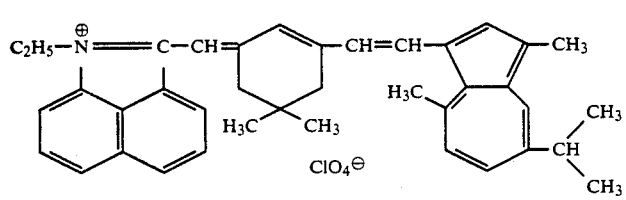 (32)
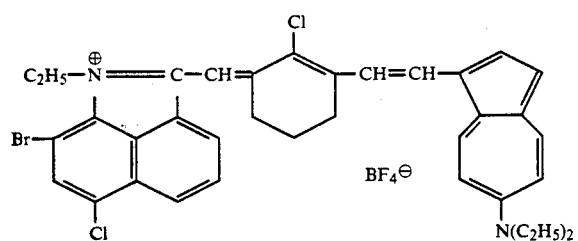 (33)
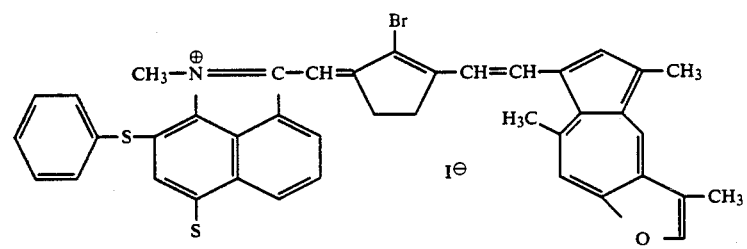 (34)
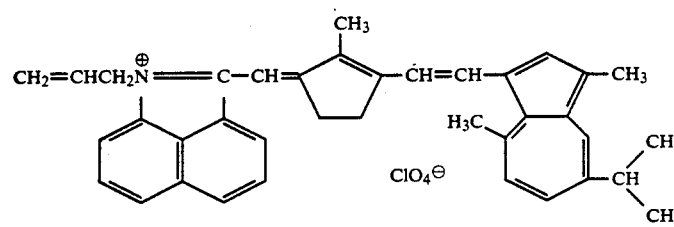 (35)

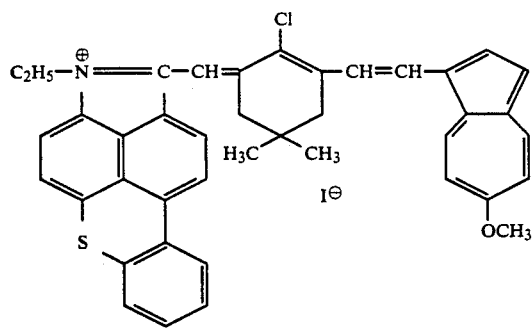
(36)
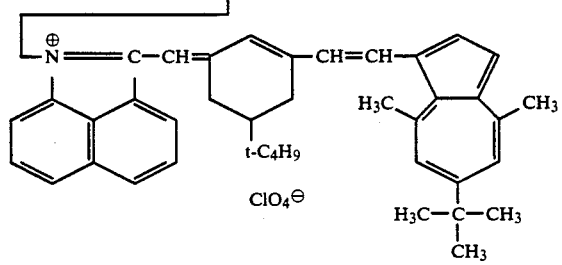
(37)
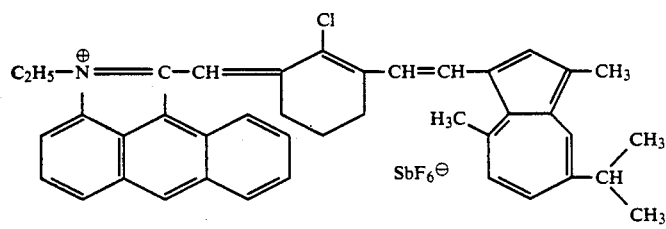
(38)
Examples of the compound represented by Formula (III):
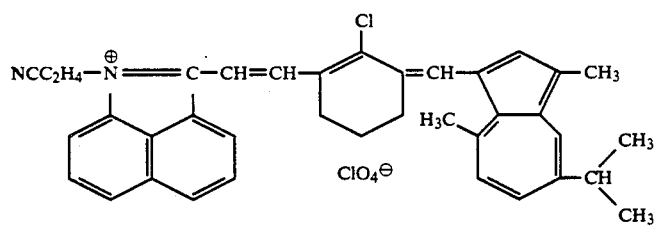
(39)
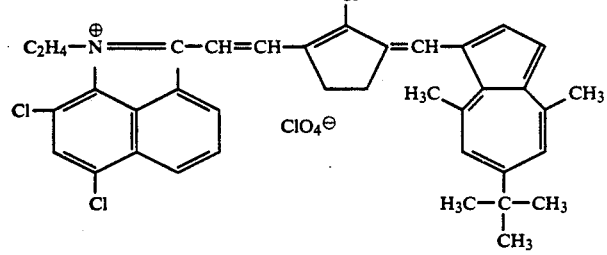
(40)

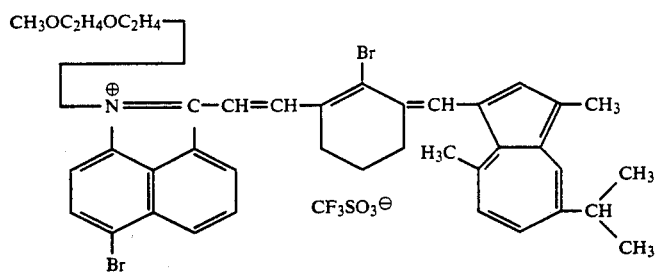
(41)
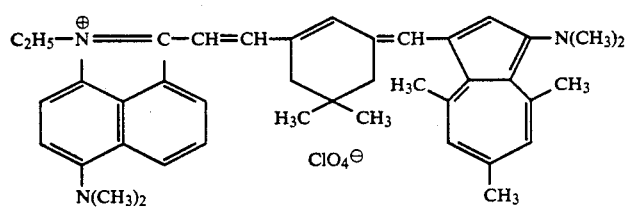
(42)
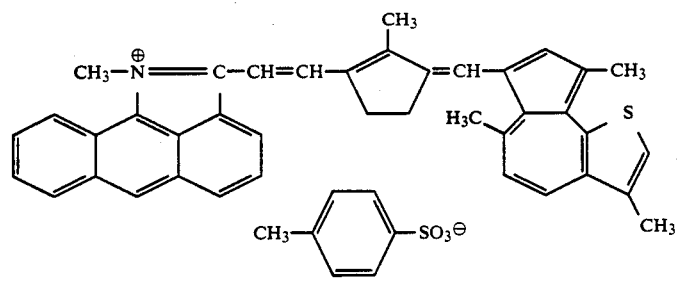
(43)
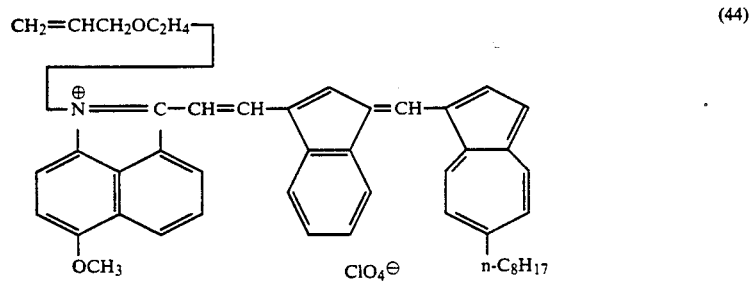
(44)
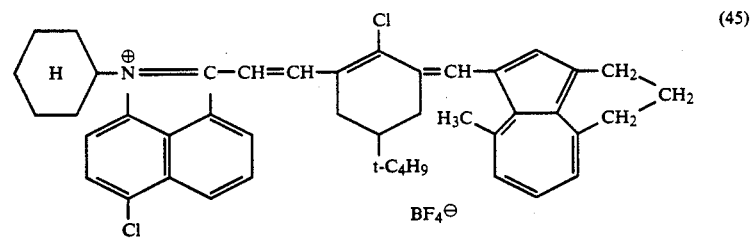
(45)
Examples of the compound represented by Formula (IV):
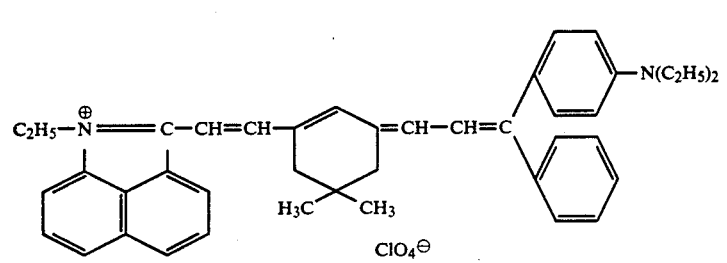
(46)

-continued
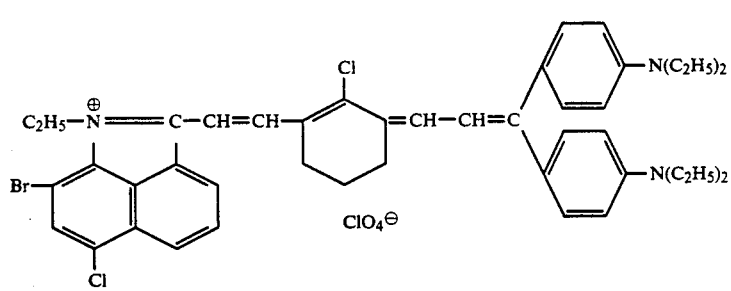
(47)
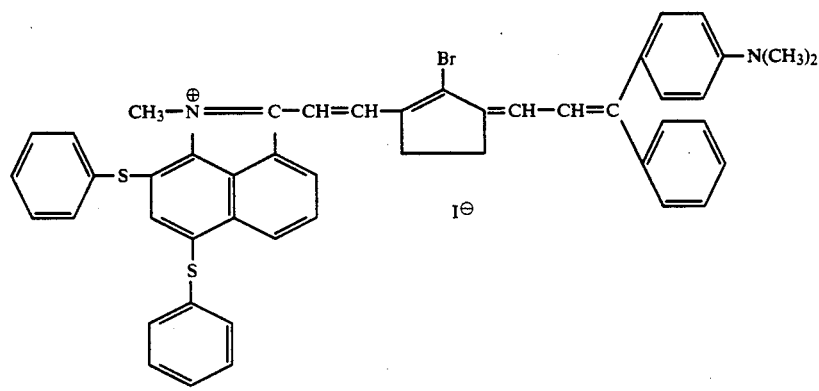
(48)
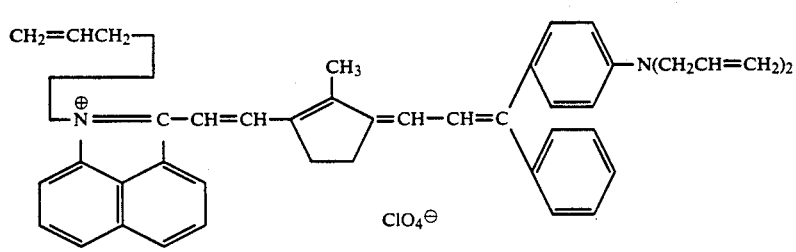
(49)
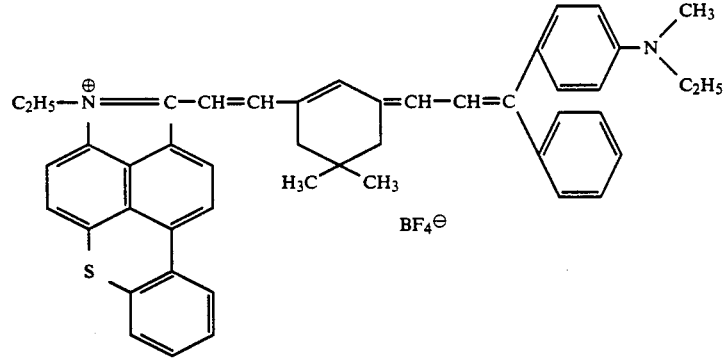
(50)
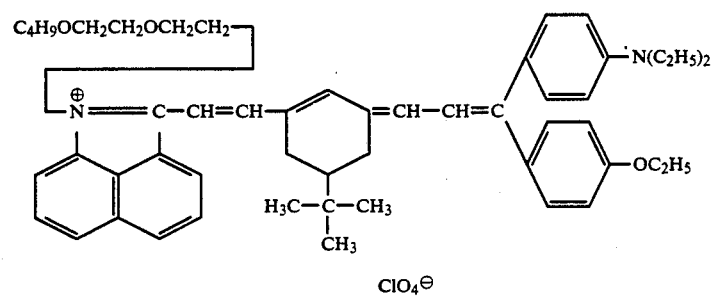
(51)

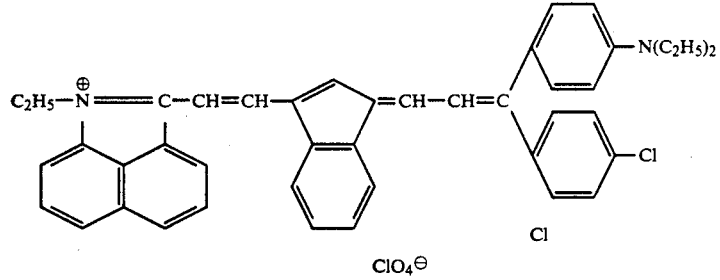
(52)
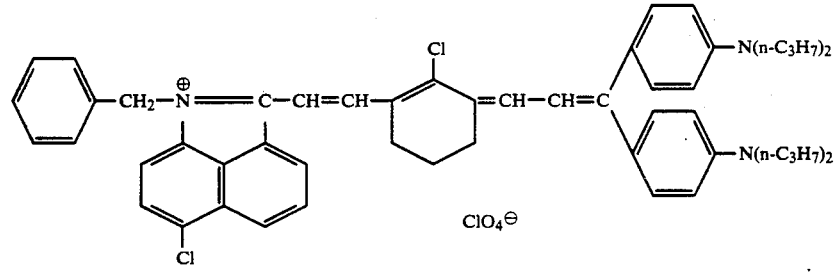
(53)
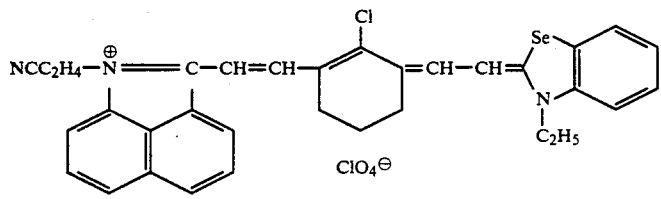
(54)
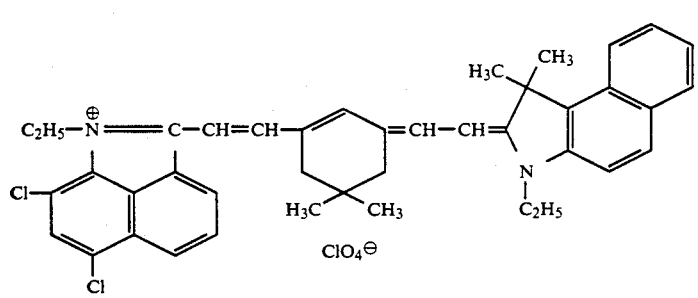
(55)
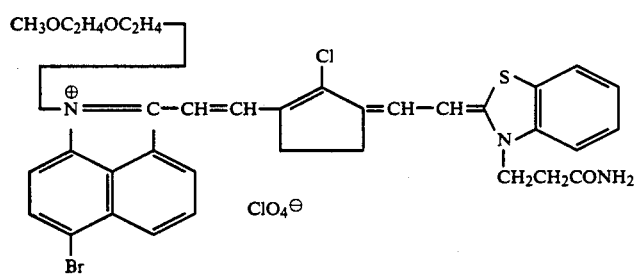
(56)
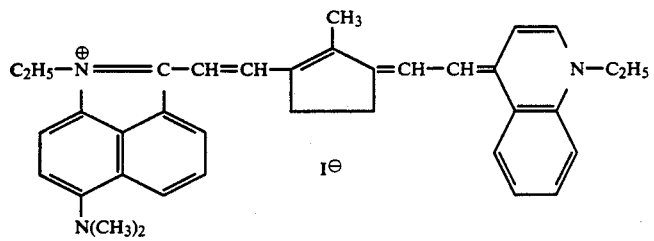
(57)

-continued
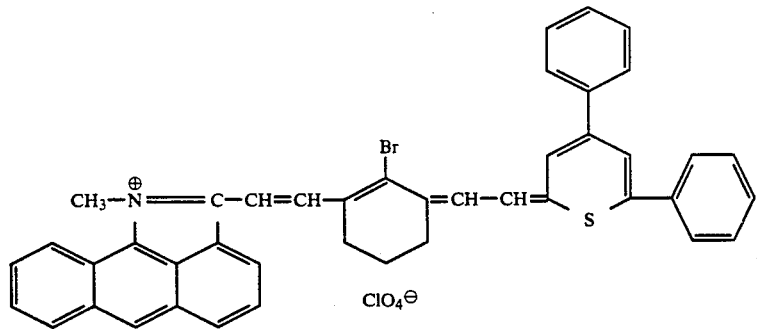
(58)
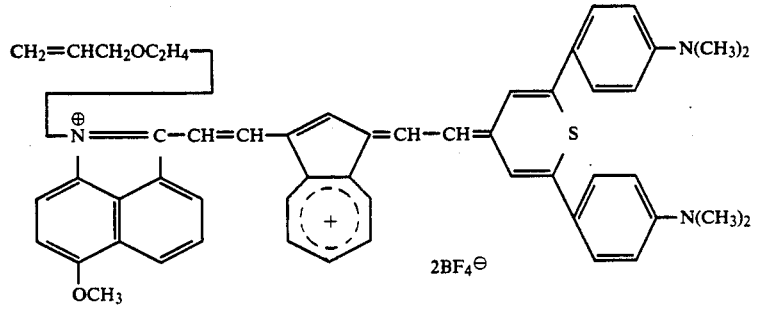
(59)
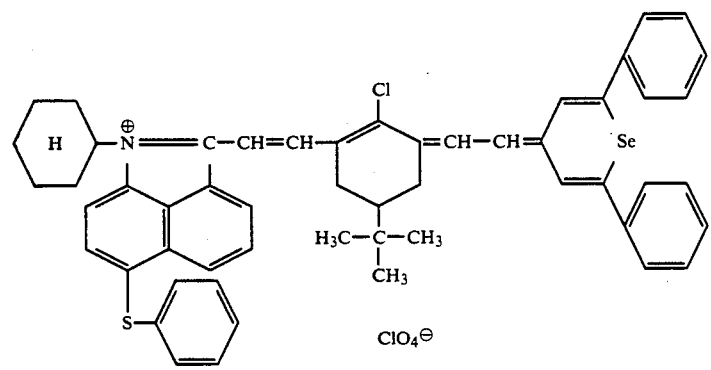
(60)
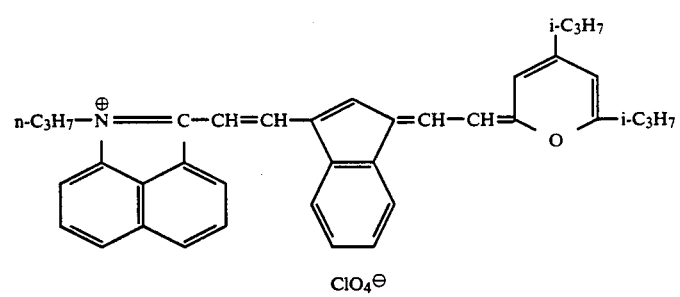
(61)
Examples of the compound represented by Formula (V):
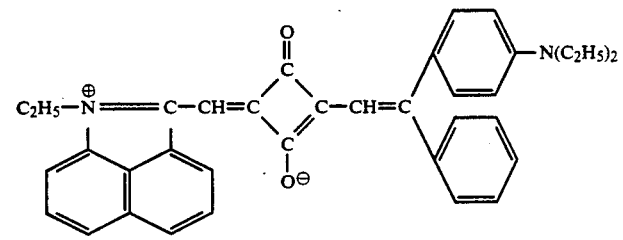
(62)

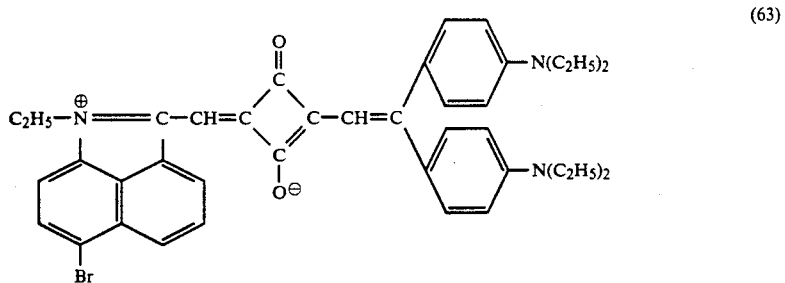
(63)
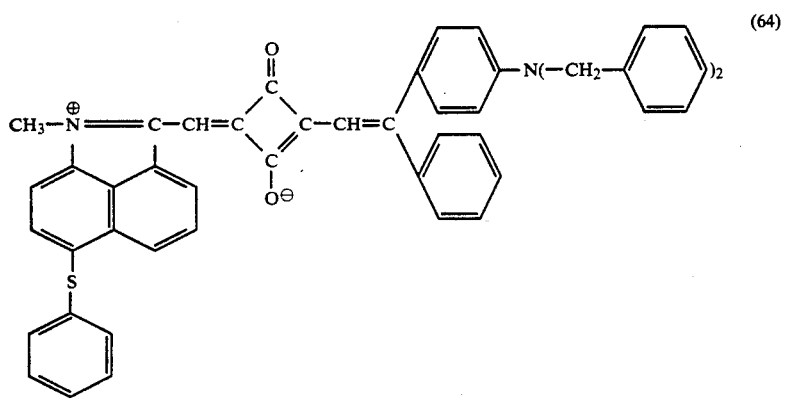
(64)
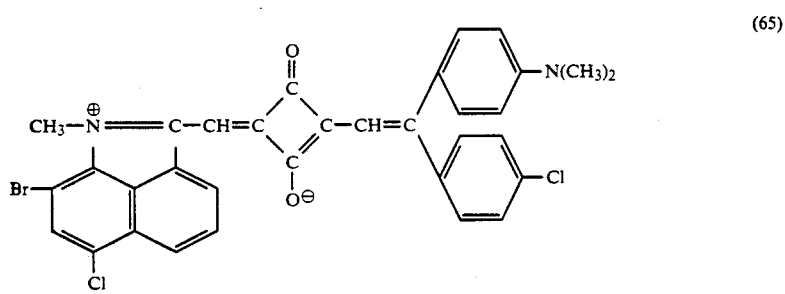
(65)
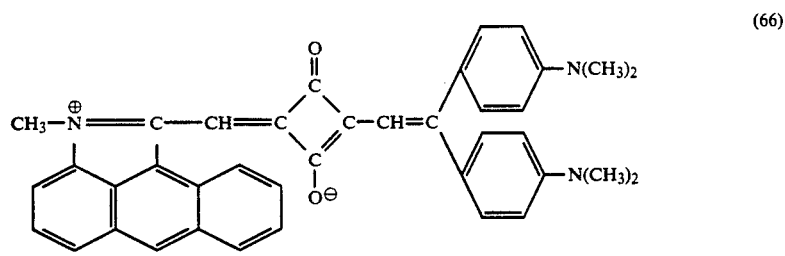
(66)
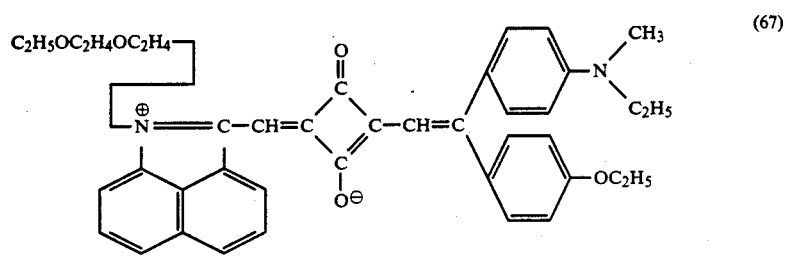
(67)

(68)
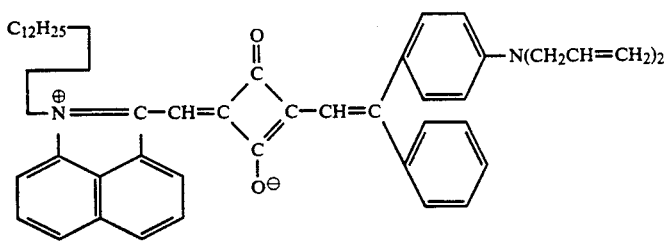
(69)
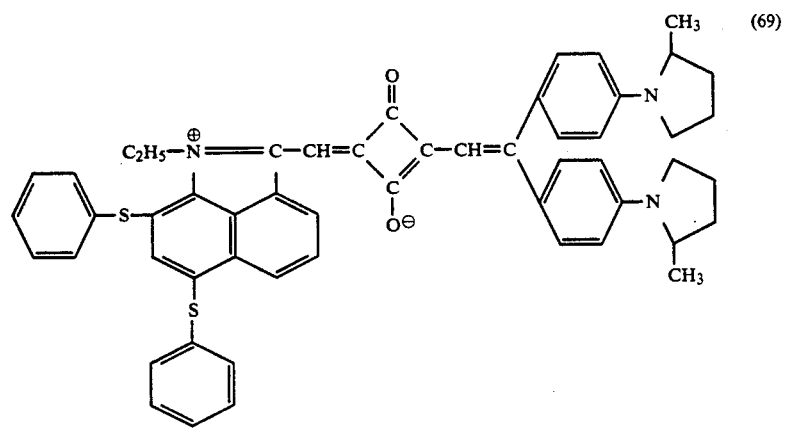
(70)
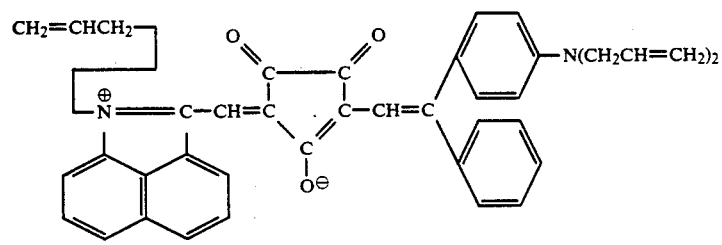
(71)
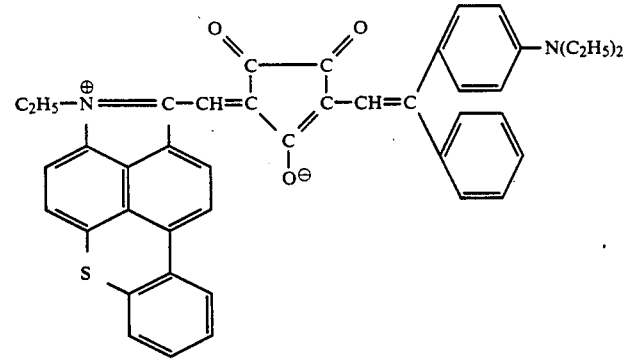
(72)
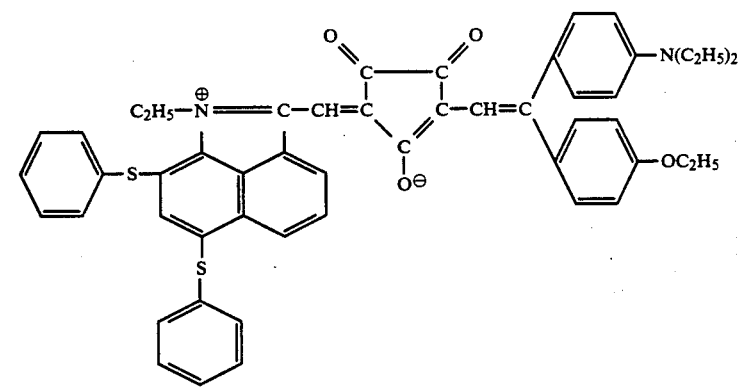

-continued
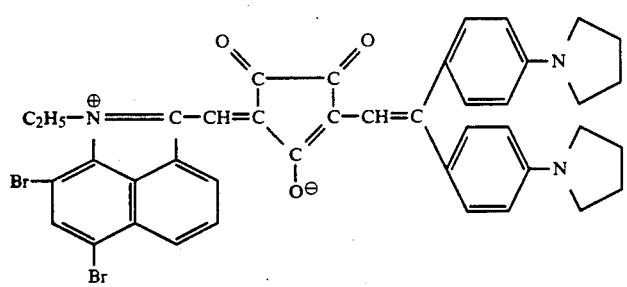
(73)
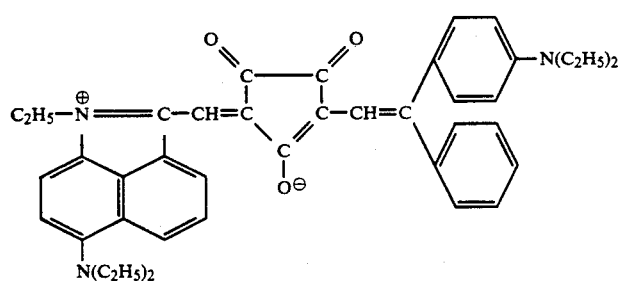
(74)
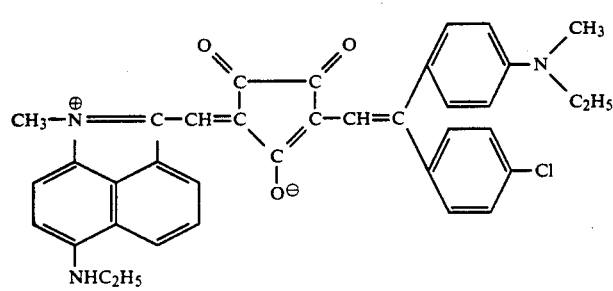
(75)
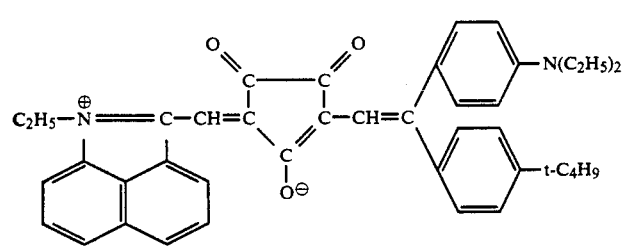
(76)
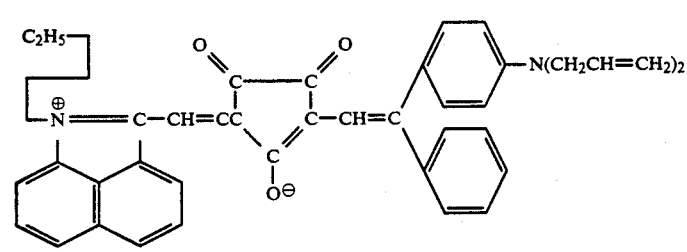
(77)
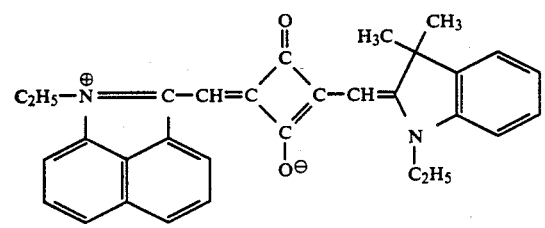
(78)

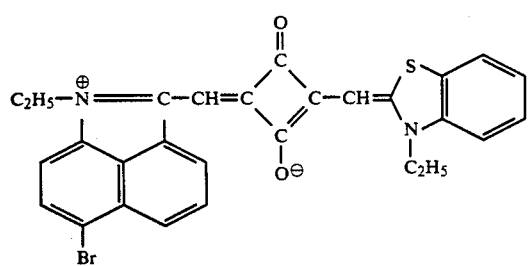 (79)
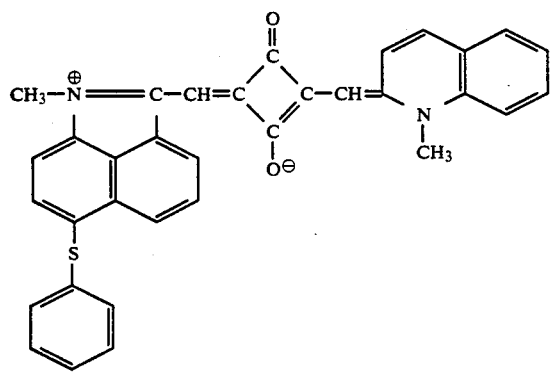 (80)
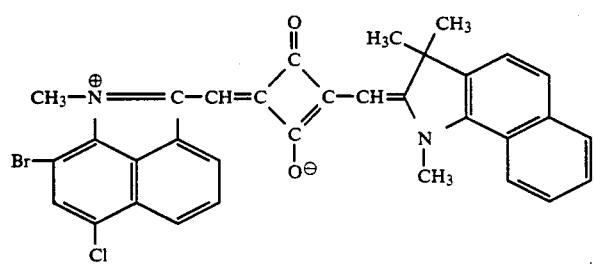 (81)
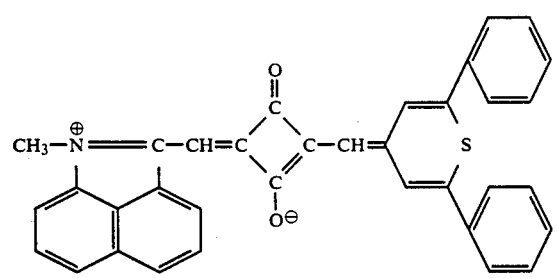 (82)
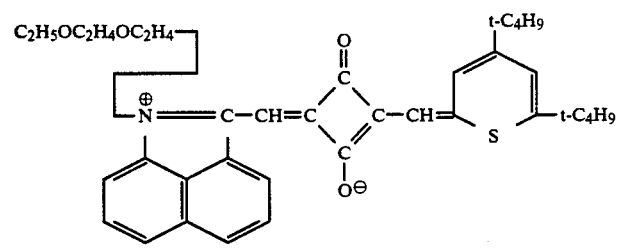 (83)
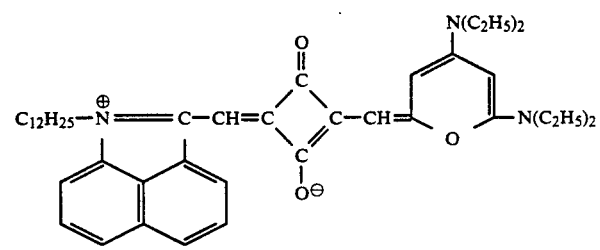 (84)

-continued
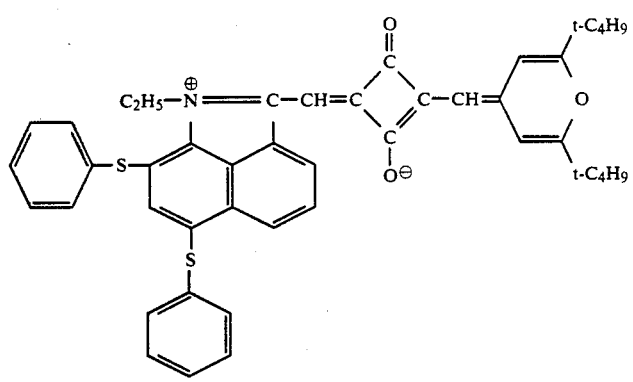 (85)
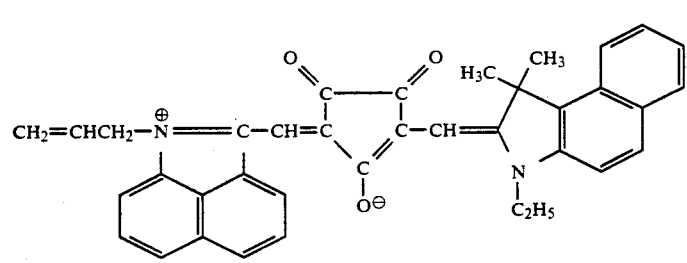 (86)
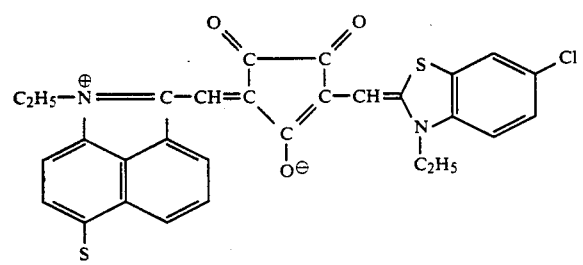 (87)
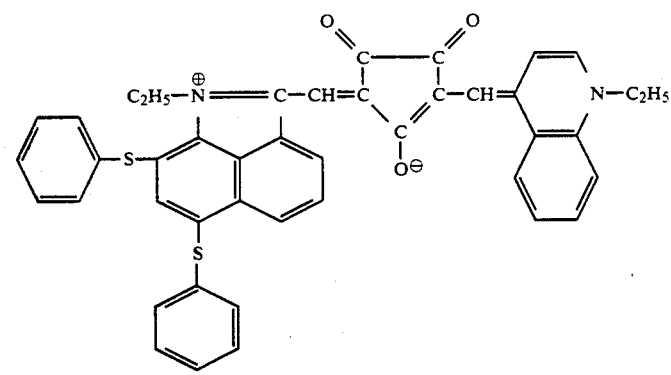 (88)
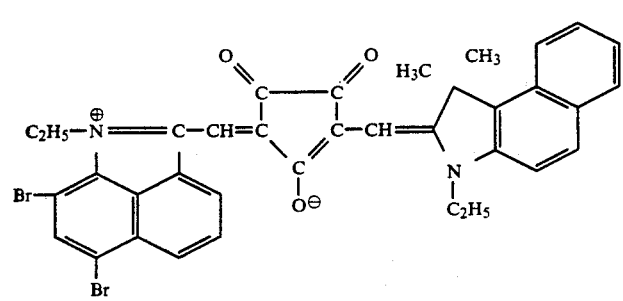 (89)

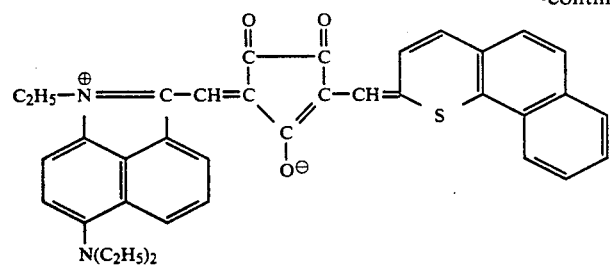
(90)
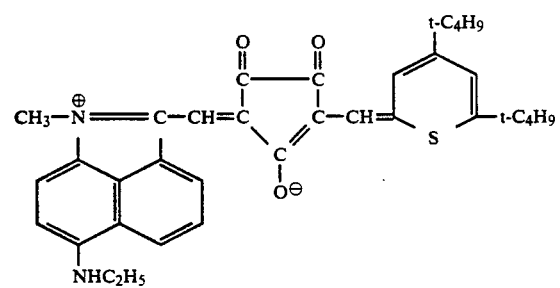
(91)
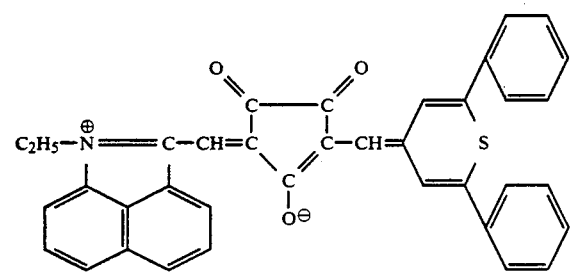
(92)
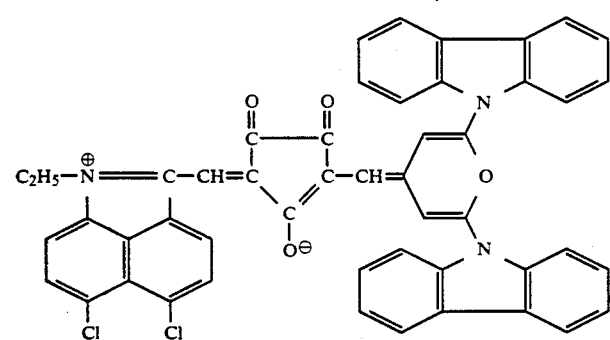
(93)
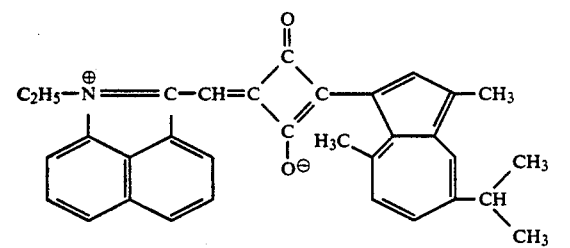
(94)
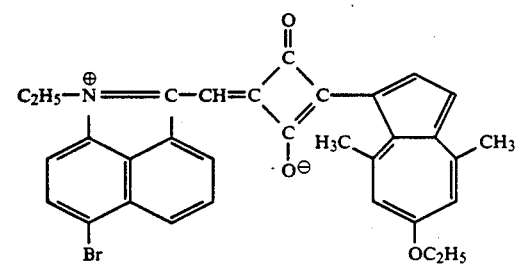
(95)

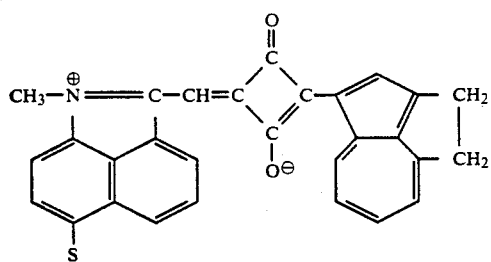
(96)
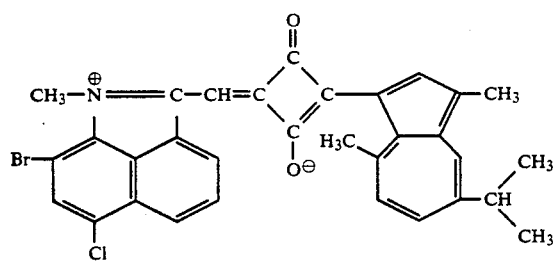
(97)
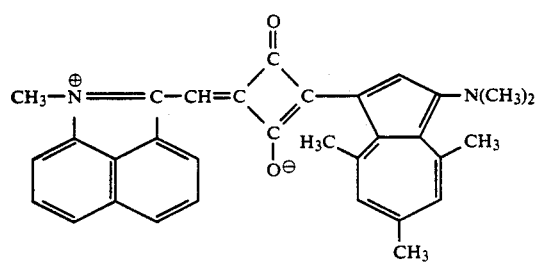
(98)
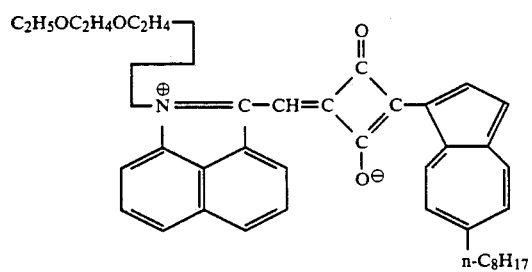
(99)
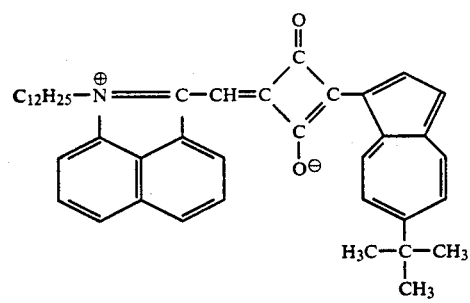
(100)
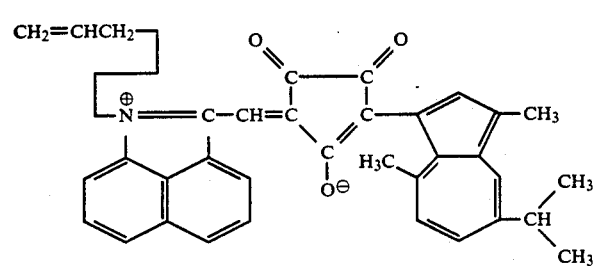
(101)

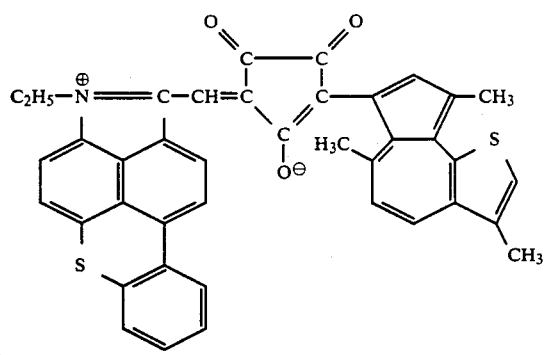
(102)
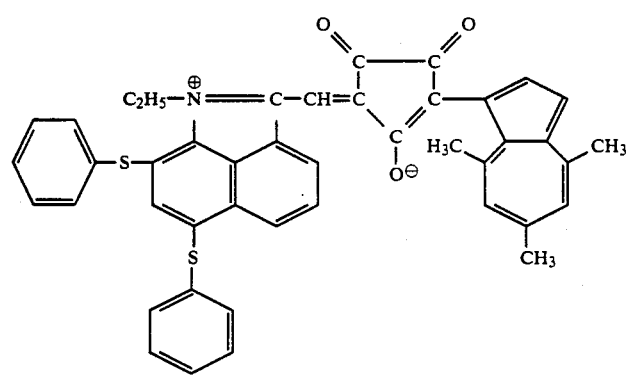
(103)
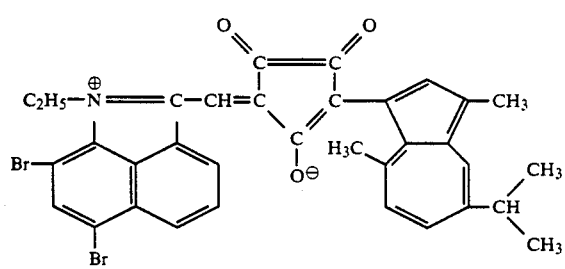
(104)
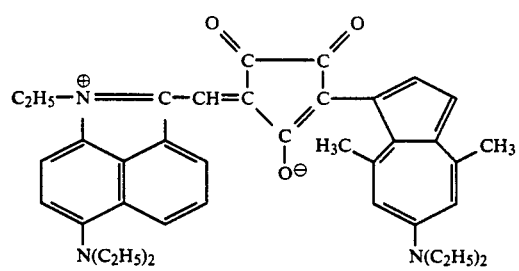
(105)
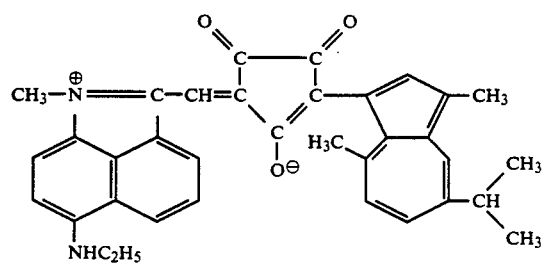
(106)

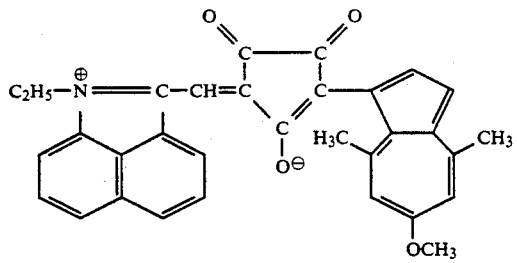

(107)

The compound represented by the above Formula (I), (II), (III), (IV) or (V) can be synthesized in the same way as the method of synthesizing cyanine, as disclosed in U.S. Pat. No. 2,734,900, i.e., by allowing a compound represented by reacting Formula (VI):

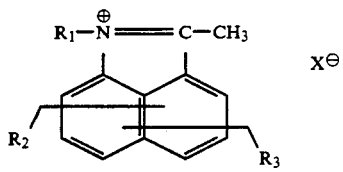

wherein $R_1$, $R_2$, $R_3$ and $X^\ominus$ have the same meaning as defined above
and a heterocyclic quaternary ammonium salt compound having an active methyl group, a pyrylium salt compound having an active methyl group, an azulene compound, an azulene compound derivative, or a compound having an active ethylene group with a compound that forms an intermediate chain, which is exemplified by malondialdehydes or glutacondialdehydes, hydroxyl compounds such as 2-chloro-1-formylhydroxyethylene cyclohexane or isophorone, dihydroxyl compounds, carbonyl compounds, diamino compounds, or trimethoxy compounds, squaric acid, croconic acid, etc.

The optical recording medium of the present invention can be formed by providing on a substrate 1 a recording layer 2 as shown in FIG. 1, that contains any of the naphtholactam compounds represented by the above Formulas (I) to (V).

Usable as the substrate 1 are plastics such as polycarbonates, polyesters, acrylic resins, polyolefin resins, phenol resins, epoxy resins, polyamides and polyimides, or glass, metals, etc.

In forming the recording layer 2, the naphtholactam compounds represented by the above Formulas (I) to (V) may be used alone or in combination of two or more compounds. There may further be used a mixture with other coloring matters. Alternatively, a layer containing other coloring matters may also be laminated on the recording layer containing the naphtholactam compound of the present invention.

Such other coloring matters include, for example, naphtholactam dyes other than the compounds of Formulas (I) to (V), polymethine dyes, azulene dyes, pyrylium dyes, squarylium dyes, croconium dyes, triphenylmethane dyes, xanthene dyes, anthraquinone dyes, cyanine dyes, phthalocyanine dyes, dioxazine dyes, tetrahydrocholine dyes, triphenothiazine dyes, phenanthrene dyes, aminium salt-diimonium salt dyes, and metal chelate complex dyes, or metals or metal compounds as exemplified by Al, Te, Bi, Sn, In, Se, SnO, TeO$_2$, As and Cd, and also ultraviolet absorbents.

The recording layer 2 may be formed on the substrate 1 by coating, or according to various methods such as vapor deposition. When the coating is employed, the layer can be formed by coating on the substrate 1 a solution obtained by dissolving or dispersing the naphtholactam compound in an organic solvent. Taking account of film-forming properties and coating stability, a binder may be optionally mixed in the recording layer to carry out film formation.

As to the organic solvent that can be used in the coating, though variable depending on whether the above naphtholactam compounds are used in the dispersed state or the dissolved state, there can be used, in general, solvents of an alcohol type, a ketone type, an amide type, an ether type, an ester type, an aliphatic halogenated hydrocarbon type, an aromatic type or an aliphatic hydrocarbon type.

The binder includes, for example, nitrocellulose, ethyl cellulose, polystyrene, polyvinyl pyrrolidone, polymethyl methacrylate and polyamide. Waxes, higher fatty acids, and amides as exemplified by oleyl amide may also be optionally used as additives.

In the above binder, plasticizers such as dioctyl phthalate, dibutyl phthalate, and tricresyl phosphate, oils such as mineral oil and vegetable oil, and also dispersants such as alkylbenzene sulfonates and polyoxyethylene alkylphenyl eters and other additives may be appropriately mixed to enhance the film-forming properties and coating stability of the recording layer.

The coating can be carried out using coating methods such as dip coating, spray coating, spin coating, bead coating, Meyer bar coating, blade coating, curtain coating, roller coating, and gravure coating.

The naphtholactam compound should be contained in the recording layer 2 usually in an amount of from 40 to 100% by weight, and preferably from 50 to 100% by weight. An amount less than 40% by weight makes it impossible to obtain satisfactory light absorption and satisfactory light reflectance to reproducing laser beams of the recording layer.

The recording layer 2 may appropriately have a film thickness of from 100 Å to 20 μm, and preferably from 200 Å to 1 μm. The layer may preferably be as thin as possible so long as a film having a sufficient light reflectance to recording laser beams can be formed in a stable state.

Figure 2:
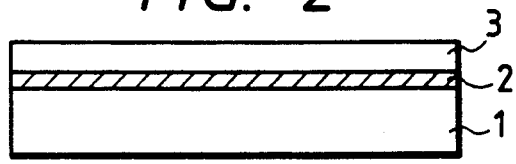

The optical recording medium of the present invention may be further provided on the recording layer 2 with a protective layer 3 as illustrated in FIG. 2, which is transparent to the recording and reproducing laser beams. The protective layer 3 may be opaque without any difficulty in the case when light is irradiated from the substrate 1 side.

Figure 3:
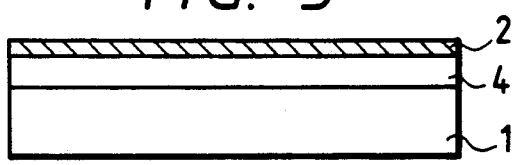

A subbing layer 4 may further be provided between the substrate 1 and the recording layer 2 as illustrated in FIG. 3.

Figure 4:
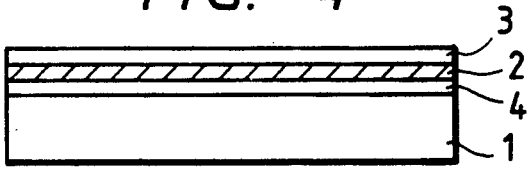

It is also possible to use together the protective layer 3 and the subbing layer 4 as illustrated in FIG. 4.

The subbing layer is provided for the purposes of (a) improving adhesion, (b) providing a barrier to water or gas, (c) improving storage stability of the recording layer, (d) improving reflectance, (e) protecting the substrate from solvents, and (f) forming pregrooves. For the purpose (a), there can be used various materials as exemplified by ionomer resins, polyamide resins, vinyl resins, natural macromolecules, silicone, and liquid rubber, or various substances such as silane coupling agents. For the purposes (b) and (c), usable in addition to the above polymeric materials are inorganic compounds as exemplified by $SiO_2$, $MgF_2$, SiO, $TiO_2$, ZnO, TiN and SiN, metals or semi-metals as exemplified by Zn, Cu, S, Ni, Cr, Ge, Se, Cd, Ag and Al. For the purpose (d), usable are metals as exemplified by Al and Ag, or organic thin films having metallic gloss, as exemplified by those comprising a cyanine dye, a methine dye or the like. For the purposes (e) and (f), usable are ultraviolet-curable resins, thermosetting resins and thermoplastic resins. The subbing layer may appropriately have a film thickness of from 50 Å to 100 μm, and preferably from 200 Å to 30 μm.

The protective layer is provided for the purposes of protection from scratches, dust, stains or the like, improving storage stability of the recording layer, and improving the reflectance. Usable as materials therefor are the same materials as in the subbing layer. The protective layer may appropriately have a film thickness of from 100 Å or more, and preferably 1,000 Å or more.

Here, the subbing layer and/or the protective layer may contain the naphtholactam compound of the invention, represented by any of Formulas (I) to (V). The subbing layer or the protective layer may also contain stabilizers, dispersants, flame-retardants, lubricants, antistatic agents, surface active agents, plasticizers, etc.

In another constitution of the optical recording medium of the present invention, the optical recording medium may have the so-called air-gap structure wherein two sheets of recording mediums having the same constitution as illustrated in FIG. 1 to FIG. 4 are used so that the recording layers 2 may be disposed inside and closed interposing spacers, or may have the so-called laminated structure wherein two sheets of recording mediums are directly laminated without the interposition of spacers.

In the optical recording medium of the present invention, it is also possible to carry out recording by irradiation with a gas laser beam such as a heliumneon laser beam (oscillation wavelength: 638 nm), but, more preferably, it is suitable to use a method in which the recording is carried out by irradiation with a laser beam preferably having a wavelength of 750 nm or more, in particular, a laser beam having oscillation wavelengths in the near infrared or infrared region, such as a gallium-aluminum-arsenic semiconductor laser beam (oscillation wavelength: 830 nm). The above laser beams can be used for readout. Then, the writing and reading can be carried out using laser beams having the same wavelength, or can also be carried out using laser beams having different wavelengths.

As described above, the optical recording medium of the present invention has absorption at the long wavelength side, can make a record with a high sensitivity even when a long wavelength oscillation laser such as a semiconductor laser is used, and can obtain a high C/N ratio because of the capability of forming pits with good shapes.

It is also possible to provide an optical recording medium that can be readily prepared by coating, has good stability to heat, and has superior storage stability with less reproduction deterioration.

EXAMPLES

The present invention will be described below in greater detail by giving Examples, but by no means limited by these.

EXAMPLE 1

On a polycarbonate (hereinafter abbreviated as "PC") substrate of 130 mm in diameter and 1.2 mm in thickness and provided with pregrooves by injection molding, a solution obtained by dissolving 3 parts by weight of an naphtholactam compound corresponding to the above compound No. (1) in 97 parts by weight of diacetone alcohol was coated by spin coating, followed by drying to give an organic thin film recording layer of 800 Å thick.

An optical recording medium thus prepared was mounted on a turn table. Rotating the turn table at 1,800 rpm with a motor and using a semiconductor laser of an oscillation wavelength of 830 nm, information was written in the recording layer from the substrate side under spot size of 1.5 μm in diameter, recording power of 8 mW and recording frequency of 3 MHz, and reproduced under a read-out power of 0.8 mW. The resulting reproduction wave form was spectrally analyzed (scanning filter, band width: 30 KHz) using a spectrum analyzer (trade name: TR4171; manufactured by Advantest K.K.) to measure C/N ratio.

Next, on the same recording medium, measured under the above measurement conditions was C/N ratio after readout was repeated $10^5$ times on the recorded area.

Further measured were transmittance (830 nm measurement) and C/N ratio after a recording medium of the same type prepared under the above conditions was left standing for 2,000 hours under conditions of 65° C. and 85% RH to carry out an environmental storage stability test. Results obtained are shown in Table 1.

EXAMPLES 2 AND 3

Example 1 was repeated to prepare optical recording mediums, except that the naphtholactam compound No. (1) as used in Example 1 was replaced with the compounds Nos. (9) and (17), respectively. Measurement was made in the same manner as in Example 1. Results thus obtained are shown in Table 1.

EXAMPLES 4 TO 27

Example 1 was repeated to prepare optical recording mediums, except that the naphtholactam compound No. (1) as used in Example 1 was replaced with the naphtholactam compounds as shown in Table 2. Evaluation was made in the same manner as in Example 1. Results thus obtained are shown in Table 2.

TABLE 1

| Example | Compound No. | Initial stage Transmittance (%) | C/N (dB) | After reproduction repeated $10^5$ times C/N (dB) | Environmental storage stability; 65° C., 85% RH, after 2,000 hrs Transmittance (%) | C/N (dB) |
|---|---|---|---|---|---|---|
| 1 | 1 | 21.5 | 56 | 54 | 23.8 | 53 |
| 2 | 9 | 22.5 | 55 | 53 | 24.3 | 52 |
| 3 | 17 | 20.3 | 55 | 54 | 22.0 | 53 |

TABLE 2

| Example | Compound No. | Initial stage Transmittance (%) | C/N (dB) | After reproduction repeated $10^5$ times C/N (dB) | Environmental storage stability; 65° C., 85% RH, after 2,000 hrs Transmittance (%) | C/N (dB) |
|---|---|---|---|---|---|---|
| 4 | 4 | 21.2 | 55 | 52 | 24.0 | 51 |
| 5 | 12 | 20.3 | 56 | 53 | 23.0 | 52 |
| 6 | 15 | 21.5 | 55 | 52 | 23.8 | 53 |
| 7 | 22 | 20.5 | 56 | 54 | 23.6 | 53 |
| 8 | 26 | 20.0 | 56 | 54 | 22.4 | 53 |
| 9 | 29 | 23.1 | 54 | 51 | 25.0 | 50 |
| 10 | 33 | 21.7 | 55 | 53 | 23.2 | 52 |
| 11 | 40 | 21.2 | 55 | 52 | 24.1 | 52 |
| 12 | 43 | 23.6 | 54 | 52 | 25.0 | 51 |
| 13 | 47 | 22.5 | 55 | 53 | 24.0 | 53 |
| 14 | 51 | 20.3 | 55 | 52 | 22.7 | 53 |
| 15 | 55 | 22.4 | 55 | 53 | 25.1 | 51 |
| 16 | 58 | 18.2 | 55 | 52 | 22.2 | 53 |
| 17 | 64 | 18.8 | 56 | 53 | 21.3 | 52 |
| 18 | 67 | 19.6 | 55 | 52 | 22.0 | 51 |
| 19 | 74 | 21.5 | 54 | 51 | 23.2 | 50 |
| 20 | 79 | 20.6 | 54 | 51 | 23.4 | 50 |
| 21 | 85 | 19.7 | 56 | 53 | 21.2 | 53 |
| 22 | 86 | 21.3 | 55 | 51 | 23.5 | 52 |
| 23 | 91 | 19.4 | 55 | 52 | 22.0 | 52 |
| 24 | 94 | 22.0 | 54 | 51 | 23.8 | 51 |
| 25 | 99 | 19.7 | 56 | 53 | 22.1 | 53 |
| 26 | 104 | 18.6 | 55 | 53 | 21.4 | 52 |
| 27 | 107 | 22.3 | 55 | 52 | 24.5 | 52 |

EXAMPLES 28 TO 33

The naphtholactam compounds of the compounds Nos. (2), (18) and (54) were mixed with the dyes (201) and (202), respectively, in weight ratio of 1:2 using diacetone alcohol as a solvent. The resulting coating solutions were each coated in the same manner as in Example 1 to provide an organic thin-film recording layer of 850 Å in dried film thickness. Optical recording mediums were thus prepared. The optical recording mediums thus prepared were evaluated in the same manner as in Example 1.

Compound No. 201

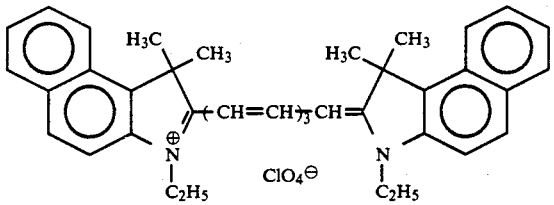

Compound No. 202

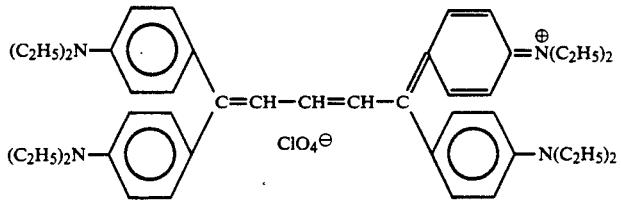

COMPARATIVE EXAMPLE 1

Example 28 was repeated to prepare an optical recording medium, except that the naphtholactam compound No. (2) was removed. Measurement was made in the same manner.

Results obtained in Examples 28 to 33 and Comparative Example 1 are shown in Table 3.

TABLE 3

| Example | Compound No. | Initial stage Transmittance (%) | C/N (dB) | After reproduction repeated $10^5$ times C/N (dB) | Environmental storage stability; 65° C., 85% RH, after 2,000 hrs Transmittance (%) | C/N (dB) |
|---|---|---|---|---|---|---|
| 28 | 2, 201 | 21.5 | 53 | 50 | 27.6 | 48 |
| 29 | 2, 202 | 20.4 | 54 | 51 | 24.0 | 50 |
| 30 | 18, 201 | 21.5 | 52 | 49 | 27.5 | 48 |
| 31 | 18, 202 | 20.3 | 54 | 51 | 24.0 | 51 |
| 32 | 54, 201 | 21.0 | 53 | 49 | 28.3 | 47 |
| 33 | 54, 202 | 19.3 | 55 | 52 | 23.8 | 51 |
| Comparative Example: | | | | | | |
| 1 | 201 | 22.1 | 50 | 45 | 34.2 | 39 |

EXAMPLE 34

On a PC substrate of 130 mm in diameter and 1.2 mm in thickness and provided with pregrooves by injection molding, a solution obtained by mixing 2 parts by weight of a naphtholactam compound corresponding to the above compound No. (7) and 1 part by weight of nitrocellulose resin (OH-less lacquer; a product of Daicel Chemical Industries, Ltd.) in 97 parts by weight of diacetone alcohol was coated by spin coating to give an organic thin film recording layer of 1,000 Å thick.

On the recording medium thus prepared, measurement was made in the same manner as in Example 1. Results obtained are shown in Table 4.

EXAMPLES 35 TO 45

Example 34 was repeated to prepare optical recording mediums, except that the naphtholactam compound No. (7) as used in Example 34 was replaced with the naphtholactam compounds as shown in Table 4. Evaluation was made in the same manner.

Results obtained are shown in Table 4.

TABLE 4

| Example | Compound No. | Initial stage Transmittance (%) | C/N (dB) | After reproduction repeated $10^5$ times C/N (dB) | Environmental storage stability; 65° C., 85% RH, after 2,000 hrs Transmittance (%) | C/N (dB) |
|---|---|---|---|---|---|---|
| 34 | 7 | 23.4 | 54 | 52 | 25.8 | 51 |
| 35 | 13 | 24.1 | 53 | 51 | 26.3 | 50 |
| 36 | 23 | 23.6 | 54 | 50 | 26.5 | 51 |
| 37 | 25 | 24.0 | 53 | 50 | 26.3 | 50 |
| 38 | 35 | 24.4 | 52 | 49 | 27.0 | 48 |
| 39 | 42 | 22.3 | 54 | 51 | 24.0 | 50 |
| 40 | 50 | 23.7 | 53 | 51 | 26.4 | 49 |
| 41 | 57 | 23.5 | 54 | 51 | 25.1 | 50 |
| 42 | 69 | 22.5 | 54 | 51 | 24.9 | 50 |
| 43 | 83 | 22.6 | 54 | 52 | 24.7 | 51 |
| 44 | 88 | 23.3 | 53 | 50 | 26.0 | 49 |
| 45 | 97 | 23.2 | 53 | 50 | 25.3 | 50 |

EXAMPLES 46 TO 57

Two kinds of the naphtholactam compound previously described were mixed in diacetone alcohol, in weight ratio of 1:1 under the combination as shown in Table 5, and the resulting solutions were each coated in the same manner as in Example to provide an organic thin-film recording layer of 850 Å in dried film thickness. Optical recording mediums of Examples 46 to 57 were thus prepared. Evaluation was made in the same manner. Results obtained are shown in Table 5.

EXAMPLES 58 TO 60

On the surface of a polycarbonate substrate of 85 mm in length, 54 mm in width and 0.4 mm in thickness, tracking grooves of 9 μm in width, 3,000 Å in depth and 12 μm in pitch were provided by hot pressing. On the resulting substrate, a solution obtained by mixing 3 parts by weight of a naphtholactam compound corresponding to the above compound No. (8), (10) or (32) in 97 parts by weight of diacetone alcohol was coated by bar coating to give an organic thin film recording layer of 1,000 Å thick.

On the resulting recording layer, an ethylenevinyl acetate dry film and a polycarbonate protective layer of 85 mm in length, 54 mm in width and 0.3 mm in thickness were laminated, which were then passed through heat rolls of a temperature of 120° C. so as to be brought into close contact. Wallet-size optical recording mediums were thus prepared.

The recording mediums thus prepared were each mounted on a stage driving in the direction of X to Y. Using a semiconductor laser of an oscillation wavelength of 830 nm, information was written in the organic thin film recording layer in the direction of Y axis, from the substrate side under spot size of 3.0 μm in diameter, recording power of 3.5 mW and recording pulse of 50 μsec, and reproduced under a read-out power of 0.3 mW. Changes in the amount of reflected light at that time were detected using an oscilloscope. From the waveforms, the contrast ratios (A-B/A; A=-signal intensity at unrecorded areas, B=signal intensity at recorded areas) were measured.

The same organic recording mediums as the above, prepared under the above conditions, were tested for the environmental storage stability under the same conditions as in Example 1 to measure the transmittance and contrast ratio after the test. Results obtained are shown in Table 6.

TABLE 5

| Example | Compound No. | Initial stage Transmittance (%) | C/N (dB) | After reproduction repeated $10^5$ times C/N (dB) | Environmental storage stability; 65° C., 85% RH, after 2,000 hrs Transmittance (%) | C/N (dB) |
|---|---|---|---|---|---|---|
| 46 | 2, 31 | 19.3 | 55 | 51 | 21.9 | 51 |
| 47 | 6, 76 | 20.5 | 56 | 52 | 23.8 | 51 |
| 48 | 9, 55 | 20.4 | 55 | 52 | 23.0 | 52 |
| 49 | 11, 84 | 21.0 | 54 | 52 | 24.1 | 51 |
| 50 | 17, 41 | 20.3 | 56 | 52 | 23.3 | 52 |
| 51 | 18, 94 | 19.9 | 55 | 52 | 21.8 | 51 |
| 52 | 37, 98 | 22.0 | 55 | 51 | 24.6 | 52 |
| 53 | 27, 101 | 20.7 | 54 | 51 | 23.8 | 51 |
| 54 | 46, 63 | 21.2 | 54 | 50 | 23.5 | 50 |
| 55 | 61, 87 | 18.5 | 55 | 53 | 21.0 | 53 |
| 56 | 62, 73 | 22.0 | 55 | 52 | 24.2 | 52 |
| 57 | 81, 89 | 19.3 | 56 | 53 | 22.2 | 52 |

TABLE 6

| Example | Compound No. | Initial stage Transmittance (%) | contrast | Environmental storage stability; 65° C., 85% RH, after 2,000 hrs Transmittance (%) | contrast |
|---|---|---|---|---|---|
| 58 | 8 | 19.7 | 0.48 | 21.5 | 0.46 |
| 59 | 10 | 20.1 | 0.49 | 21.9 | 0.46 |
| 60 | 32 | 19.5 | 0.48 | 20.9 | 0.46 |

We claim:

1. An optical recording medium comprising at least one naphtholactam compound represented by the following Formulas (I), (II), (III), (IV) and (V):

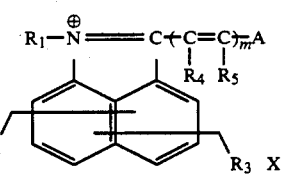

Formula (I)

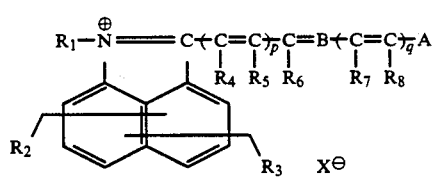

Formula (II)

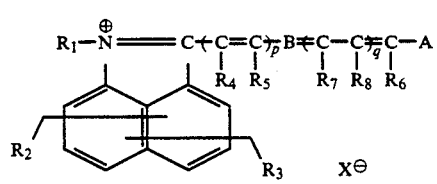

Formula (III)

-continued

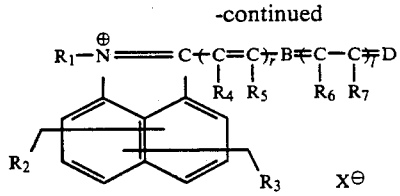
(Formula (IV))

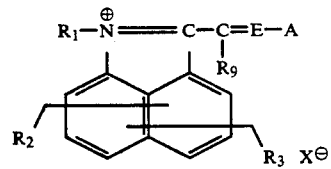
Formula (V)

wherein A represents

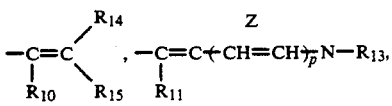

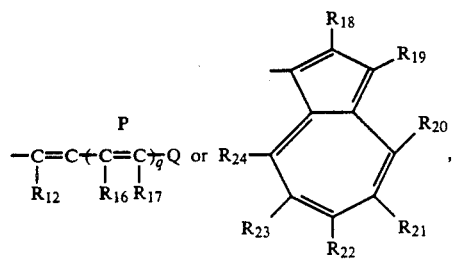

B represents

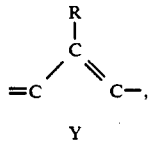

D represents

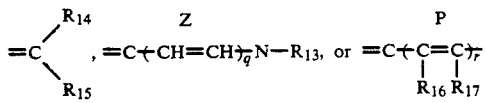

E represents

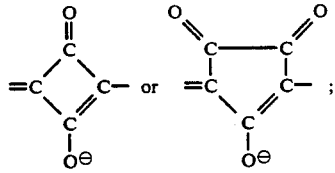

Z represents a group of atoms necessary to complete a substituted or unsubstituted
nuclei of thiazole series, nuclei of benzothiazole series, nuclei of naphthothiazole series, nuclei of thionaphthene (7, 6-d) thiazole series, nuclei of oxazole series, nuclei of benzoxazole series, nuclei of naphthoxazole series, nuclei of selenazole series, nuclei of benzoselenazole series, nuclei of naphthoselenazole series, nuclei of thiazoline series, nuclei of oxazoline series, nuclei of selenazoline series, nuclei of 2-quinoline series, nuclei of 4-quinoline series, nuclei of 1-isoquinoline series, nuclei of 3-isoquinoline series, nuclei of 3,3-dialkylindolenine series, nuclei of pyridine series and nuclei of benzimidazole series;

Q represents a sulfur atom, an oxygen atom, or a selenium atom;

P represents a hydrocarbon group comprising a group of atoms necessary to complete a substitute or unsubstituted pyran, thiopyran, selenapyran, benzopyran, benzothiopyran, benzoselenapyran, naphthopyran, naphthothiopyran or naphthoselenapyran;

Y represents a divalent hydrocarbon group that forms a substituted or unsubstituted ring of 5 or 6 members;

$R_1$ represents a substituted or unsubstituted alkyl group, cycloalkyl group, alkoxy group, allyl group, aryl group or aralkyl group, and $R_2$ to $R_{12}$ and $R_{18}$ to $R_{24}$ each represent a hydrogen atom, a halogen atom or a monovalent organic residual group, where at least one combination of the combinations of $R_{18}$ and $R_{19}$, $R_{19}$ and $R_{20}$, $R_{20}$ and $R_{21}$, $R_{21}$ and $R_{22}$, $R_{22}$ and $R_{23}$, and $R_{23}$ and $R_{24}$ may form a substituted or unsubstituted condensed ring;

$R_{13}$ represents a hydrogen atom, a substituted or unsubstituted alkyl group, a cyclic alkyl group, an allyl group, a substituted or unsubstituted aralkyl group or a substituted or unsubstituted aryl group;

$R_{14}$, $R_{15}$, $R_{16}$ and $R_{17}$ each represent a substituted or unsubstituted alkyl group, a substituted or unsubstituted aryl group, a substituted or unsubstituted styryl group, or a substituted or unsubstituted heterocyclic group and $R_{16}$ and $R_{17}$ can also be a hydrogen atom; and m represents an integer of 1, 2 or 3; p, an integer of 0, 1 or 2; q, an integer of 0, 1 or 2; r, an integer of 1 or 2; and l, an integer of 1 or 2; and $X^\ominus$ represents an anion.

2. An optical recording medium according to claim 1, wherein, in the naphtholactam compounds represented by Formulas (I), (II), (III) and (V), A is

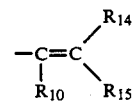

and $R_{14}$ and $R_{15}$ are substituted or unsubstituted aryl groups.

3. An optical recording medium according to claim 1, wherein at least one of $R_{14}$ and $R_{15}$ is an alkyl-substituted aminophenyl group or an alkenyl-substituted aminophenyl group.

4. An optical recording medium according to claim 1, wherein, in the naphtholactam compound represented by Formula (IV), A is

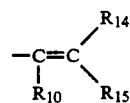

and $R_{14}$ and $R_{15}$ are substituted or unsubstituted aryl groups.

5. An optical recording medium according to claim 4, wherein at least one of $R_{14}$ and $R_{15}$ is an alkyl-substituted aminophenyl group or an alkenyl-substituted aminophenyl group.

6. An optical recording medium according to claim 1, comprising a recording layer containing at least one compound selected from the naphtholactam compounds represented by Formulas (I) to (V), said naphtholactam compound being contained in said recording layer in an amount of from 40 to 100 wt. %.

7. An optical recording medium according to claim 6, wherein said at least one compound selected from the naphtholactam compounds represented by Formulas (I) to (V) is contained in a recording layer in an amount of from 50 to 100 wt. %.

8. An optical recording-reproducing method, comprising the steps of recording or reproducing information, by selecting an optical recording medium containing at least one of naphtholactam compounds represented by the following Formulas (I), (II), (III), (IV) and (V):

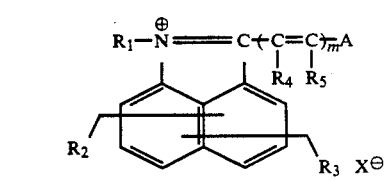

Formula (I)

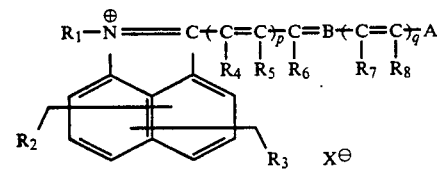

Formula (II)

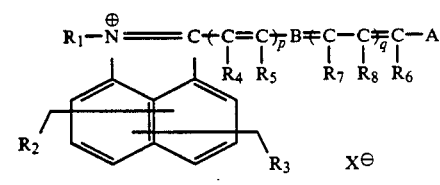

Formula (III)

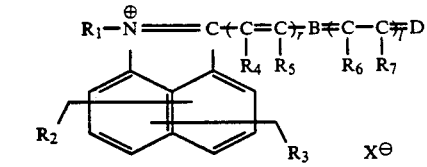

(Formula (IV))

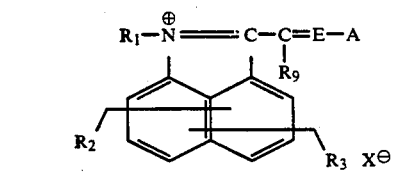

Formula (V)

wherein A represents

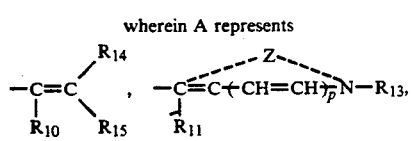

-continued

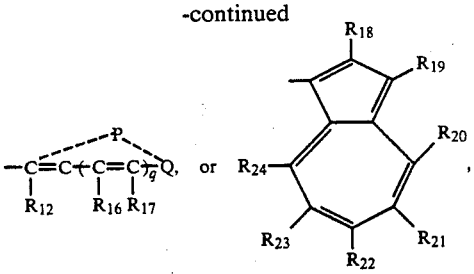

B represents

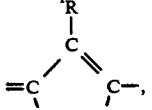

D represents

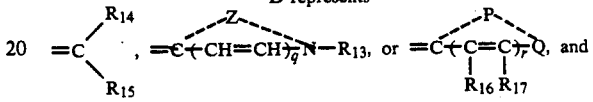

E represents

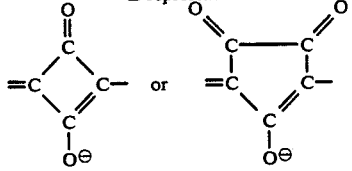

Z represents a group of atoms necessary to complete a substituted or unsubstituted nuclei of thiazole series, nuclei of benzothiazole series, nuclei of naphthothiazole series, nuclei of thionaphthene (7,6-d) thiazole series, nuclei of oxazole series, nuclei of benzoxazole series, nuclei of naphthoxazole series, nuclei of selenazole series, nuclei of benzoselenazole series, nuclei of naphthoselenazole series, nuclei of thiazoline series, nuclei of oxazoline series, nuclei of selenazoline series, nuclei of 2-quinoline series, nuclei of 4-quinoline series, nuclei of 1-isoquinoline series, nuclei of 3-isoquinoline series, nuclei of 3,3-dialkylindolenine series, nuclei of pyridine series and nuclei of benzimidazole series;

Q represents a sulfur atom, an oxygen atom, or a selenium atom;

P represents a hydrocarbon group comprising a group of atoms necessary to complete a substitute or unsubstituted pyran, thiopyran, selenapyran, benzopyran, benzothiopyran, benzoselenapyran, naphthopyran, naphthothiopyran or naphthoselenapyran;

Y represents a divalent hydrocarbon group that forms a substituted or unsubstituted ring of 5 or 6 members; $R_1$ represents a substituted or unsubstituted alkyl group, cycloalkyl group, alkoxy group, allyl group, aryl group or aralkyl group, and $R_2$ to $R_{12}$ and $R_{18}$ to $R_{24}$ each represent a hydrogen atom, a halogen atom or a monovalent organic residual group, where at least one combination of the combinations of $R_{18}$ and $R_{19}$, $R_{19}$ and $R_{20}$, $R_{20}$ and $R_{21}$, $R_{21}$ and $R_{22}$, $R_{22}$ and $R_{23}$, and $R_{23}$ and $R_{24}$ may form a substituted or unsubstituted condensed ring;

$R_{13}$ represents a hydrogen atom, a substituted or unsubstituted alkyl group, a cyclic alkyl group, an allyl group, a substituted or unsubstituted aralkyl group or a substituted or unsubstituted aryl group; $R_{14}$, $R_{15}$, $R_{16}$ and $R_{17}$ each represent a substituted or unsubstituted alkyl group, a substituted or unsubstituted aryl group, a substituted or unsubstituted styryl group, or a substituted or unsubstituted heterocyclic group and $R_{16}$ and $R_{17}$ can also be a hydrogen atom;

m represents an integer of 1, 2 or 3; p, an integer of 0, 1 or 2; q, an integer of 0, 1 or 2; r, an integer of 1 or 2; and l, an integer of 1 or 2; and X⊖ represents an anion; and irradiating said optical recording medium with a laser beam.

* * * * *

UNITED STATES PATENT AND TRADEMARK OFFICE
CERTIFICATE OF CORRECTION

PATENT NO. : 5,187,043
DATED : February 16, 1993
INVENTOR(S) : SANTOH ET AL.

It is certified that error appears in the above-indentified patent and that said Letters Patent is hereby corrected as shown below:

COLUMN 2

Line 52, "N⊕ ====== C" should read

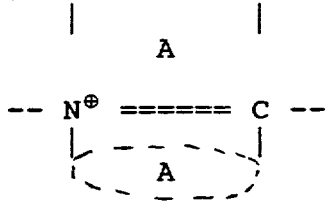

COLUMN 3

Line 64, Insert: --In Formulas (I) to (V), A represents--.

COLUMN 5

Line 15, "view" should read --views--.

COLUMN 8

Line 31, "6-mthoxyquinoline," should read --6-methoxyquinoline,--.

COLUMN 9

Line 46, "(mehtylsulfonyl)-" should read --(methylsulfonyl)- --.

COLUMN 37

Example 77, "CH = CC" should read --CH = C--.

UNITED STATES PATENT AND TRADEMARK OFFICE
CERTIFICATE OF CORRECTION

PATENT NO. : 5,187,043
DATED : February 16, 1993
INVENTOR(S) : SANTOH ET AL.

It is certified that error appears in the above-indentified patent and that said Letters Patent is hereby corrected as shown below:

COLUMN 56

Example 53, "27, 101" should read --37, 101--.

COLUMN 57

Line 20, "    "    --    --

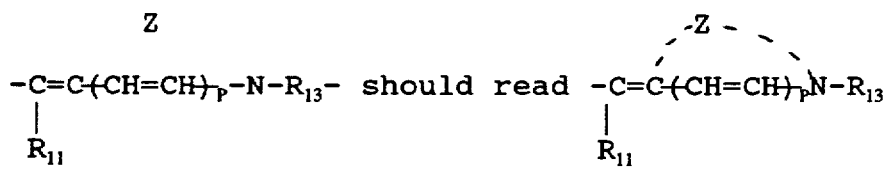

Line 29, "    "    --    --

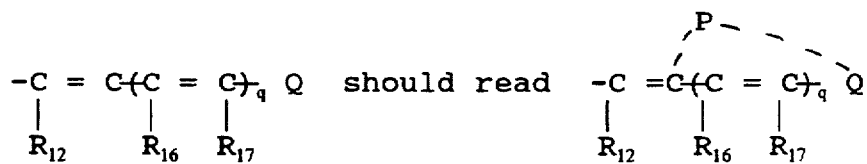

UNITED STATES PATENT AND TRADEMARK OFFICE
CERTIFICATE OF CORRECTION

PATENT NO. : 5,187,043
DATED : February 16, 1993
INVENTOR(S) : SANTOH ET AL.

It is certified that error appears in the above-indentified patent and that said Letters Patent is hereby corrected as shown below:

COLUMN 57

Line 39, " 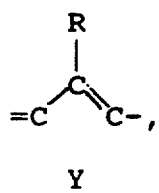 " should read -- 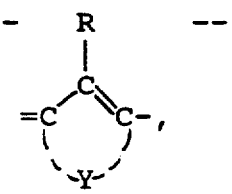 --

Line 45,

" 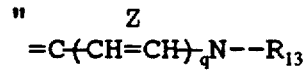 " should read -- 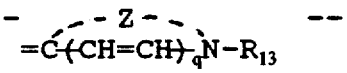 -- and " 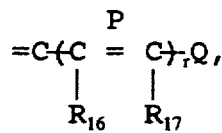 " should read -- 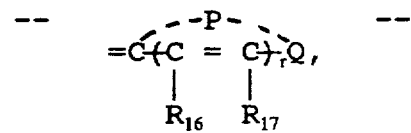 --

UNITED STATES PATENT AND TRADEMARK OFFICE
CERTIFICATE OF CORRECTION

PATENT NO. : 5,187,043
DATED : February 16, 1993
INVENTOR(S) : SANTOH ET AL.

It is certified that error appears in the above-indentified patent and that said Letters Patent is hereby corrected as shown below:

COLUMN 57

Line 17, "wherein A represents" should be deleted.

Signed and Sealed this

Fourteenth Day of December, 1993

Attest:

BRUCE LEHMAN

Attesting Officer     Commissioner of Patents and Trademarks